US012771850B2

(12) United States Patent
Xie

(10) Patent No.: US 12,771,850 B2
(45) Date of Patent: Oct. 20, 2026

(54) ENCODING AND DECODING METHOD AND STORAGE MEDIUM

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/989,311

(22) Filed: Dec. 20, 2024

(65) Prior Publication Data

US 2025/0126271 A1 Apr. 17, 2025

Related U.S. Application Data

(63) Continuation of application No. PCT/CN2022/103686, filed on Jul. 4, 2022.

(51) Int. Cl.
*H04N 19/159* (2014.01)
*H04N 19/12* (2014.01)
(Continued)

(52) U.S. Cl.
CPC ........... *H04N 19/159* (2014.11); *H04N 19/12* (2014.11); *H04N 19/176* (2014.11); *H04N 19/61* (2014.11)

(58) Field of Classification Search
None
See application file for complete search history.

(56) References Cited

U.S. PATENT DOCUMENTS

2022/0060751 A1* 2/2022 Nam .................... H04N 19/593
2022/0329862 A1* 10/2022 Huo ........................ H04N 19/12
2023/0199189 A1* 6/2023 Koo ..................... H04N 19/186
375/240.02

FOREIGN PATENT DOCUMENTS

CN 113826395 A 12/2021
CN 113853797 A 12/2021
(Continued)

OTHER PUBLICATIONS

Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29 20th Meeting, by teleconference, Oct. 7-16, 2020. 511 pages.
(Continued)

*Primary Examiner* — Jessica M Prince
(74) *Attorney, Agent, or Firm* — Sheppard, Mullin, Richter & Hampton LLP

(57) ABSTRACT

A decoding method is provided. A bitstream is decoded to determine a prediction mode parameter. The bitstream is decoded to determine a matrix-based intra prediction (MIP) parameter of a current block, in response to the prediction mode parameter indicating that MIP is used to determine an intra prediction value. The bitstream is decoded to determine transform coefficients of the current block and a low-frequency non-separable transform (LFNST) index of the current block. A mapping mode of an LFNST transform set is determined according to the MIP parameter, in response to the LFNST index indicating that an LFNST is used for the current block. According to the mapping mode of the LFNST transform set, one LFNST transform kernel candidate set is selected from a plurality of LFNST transform kernel candidate sets, and an LFNST transform kernel used
(Continued)

for the current block is determined from the selected LFNST transform kernel candidate set.

17 Claims, 9 Drawing Sheets

(51) Int. Cl.
*H04N 19/176* (2014.01)
*H04N 19/61* (2014.01)

(56) References Cited

FOREIGN PATENT DOCUMENTS

| | | | |
|---|---|---|---|
| CN | 114450945 | A | 5/2022 |
| CN | 114556943 | A | 5/2022 |
| JP | 2022532114 | A | 7/2022 |
| WO | 2020226424 | A1 | 11/2020 |
| WO | 2021134327 | A1 | 7/2021 |
| WO | 2021134635 | A1 | 7/2021 |

OTHER PUBLICATIONS

Chen et al., "Algorithm description for Versatile Video Coding and Test Model 11 (VTM 11)", Document: JVET-T2002-v1, Joint Video Experts Team (JVET) of ITU-T SG 16 WP 3 and ISO/IEC JTC 1/SC 29 20th Meeting, by teleconference, Oct. 7-16, 2020. 102 pages.

Coban et al, "Algorithm description of Enhanced Compression Model 3 (ECM 3)", Document: JVET-X2025, Joint Video Experts Team (JVET) of ITU-T SG 16 WP 3 and ISO/IEC JTC 1/SC 29 23rd Meeting, by teleconference, Jul. 7-16, 2021. 28 pages.

Huo et al., "EE2-related: Modification of LFNST for MIP coded block", Xidian University, Guangdong OPPO Mobile Telecommunications Corp., Ltd, Document: JVET-Z0048-v3, Joint Video Experts Team (JVET) of ITU-T SG 16 WP 3 and ISO/IEC JTC 1/SC 29 26th Meeting, by teleconference, Apr. 20-29, 2022. 4 pages.

WIPO, International Search Report and Written Opinion for International Application No. PCT/CN2022/103686, Sep. 26, 2022. 16 pages (with English translation).

* cited by examiner

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| predModeIntra | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 |
| SetIdx | 2 | 2 | 2 | 2 | 2 | 2 | 2 | 2 | 2 | 2 | 2 | 2 | 2 | 2 | 0 | 1 | 2 | 3 | 4 | 5 | 6 | 7 | 8 | 9 | 10 | 11 | 12 | 13 | 14 | 15 | 16 | 17 |
| predModeIntra | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| SetIdx | 18 | 19 | 20 | 21 | 22 | 23 | 24 | 25 | 26 | 27 | 28 | 29 | 30 | 31 | 32 | 33 | 34 | 33 | 32 | 31 | 30 | 29 | 28 | 27 | 26 | 25 | 24 | 23 | 22 | 21 | 20 | 19 |
| predModeIntra | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | 79 | 80 | |
| SetIdx | 18 | 17 | 16 | 15 | 14 | 13 | 12 | 11 | 10 | 9 | 8 | 7 | 6 | 5 | 4 | 3 | 2 | 2 | 2 | 2 | 2 | 2 | 2 | 2 | 2 | 2 | 2 | 2 | 2 | 2 | 2 | |

FIG. 2

ENCODING AND DECODING METHOD AND STORAGE MEDIUM

CROSS-REFERENCE TO RELATED APPLICATION (S)

This application is a continuation of International Application No. PCT/CN2022/103686, filed Jul. 4, 2022, the disclosure of which is hereby incorporated by reference in its entirety.

TECHNICAL FIELD

This disclosure relates to the field of picture processing technology, in particular to an encoding and decoding method and a storage medium.

BACKGROUND

As increasing requirements of people on video display quality, new video application forms such as high-definition and ultra-high-definition video emerge. H.265/high efficiency video coding (HEVC) has been unable to meet needs of rapid developing video applications. Joint video exploration team (JVET) proposes the next-generation video coding standard H.266/versatile video coding (VVC), with a corresponding test model of VVC test model (VTM). The enhanced compression model (ECM) begins to receive newer and more efficient compression algorithms on basis of VTM 10.0.

Decoder side intra mode derivation (DIMD) is an intra prediction technology of the ECM. This technology aims to derive an intra prediction mode at a decoding side by using the same method as an encoding side, to save the bit overhead.

However, the use of the DIMD technology introduces great complexity in both software and hardware, which increases the compression cost.

SUMMARY

In a first aspect, embodiments of the disclosure provide a decoding method. The decoding method is applied to a decoder and includes the following. A bitstream is decoded to determine a prediction mode parameter. The bitstream is decoded to determine a matrix-based intra prediction (MIP) parameter of a current block, in response to the prediction mode parameter indicating that MIP is used to determine an intra prediction value. The bitstream is decoded to determine transform coefficients of the current block and a low-frequency non-separable transform (LFNST) index of the current block. A mapping mode of an LFNST transform set is determined according to the MIP parameter, in response to the LFNST index indicating that an LFNST is used for the current block. According to the mapping mode of the LFNST transform set, one LFNST transform kernel candidate set is selected from multiple LFNST transform kernel candidate sets, and an LFNST transform kernel used for the current block is determined from the selected LFNST transform kernel candidate set. The transform coefficients are transformed using the LFNST transform kernel.

In a second aspect, embodiments of the disclosure provide an encoding method. The encoding method is applied to an encoder and includes the following. A prediction mode parameter is determined. An MIP parameter of a current block is determined, in response to the prediction mode parameter indicating that MIP is used for the current block to determine an intra prediction value. An intra prediction block of the current block is determined according to the MIP parameter, and a residual block obtained by subtracting the intra prediction value from the current block is calculated. A mapping mode of an LFNST transform set is determined according to the MIP parameter, in response to an LFNST being used for the current block. According to the mapping mode of the LFNST transform set, one LFNST transform kernel candidate set is selected from multiple LFNST transform kernel candidate sets, an LFNST transform kernel used for the current block is determined from the selected LFNST transform kernel candidate set, and an LFNST index is set and the LFNST index is signaled into a video bitstream. The residual block is transformed using the LFNST transform kernel.

In a third aspect, embodiments of the disclosure provide a non-transitory computer-readable storage medium. The non-transitory computer-readable storage medium stores a bitstream. The bitstream is generated according to the method of the second aspect.

BRIEF DESCRIPTION OF THE DRAWINGS

FIG. 2 is a correspondence table of intra prediction modes and transform sets.

DETAILED DESCRIPTION

Figure 1:
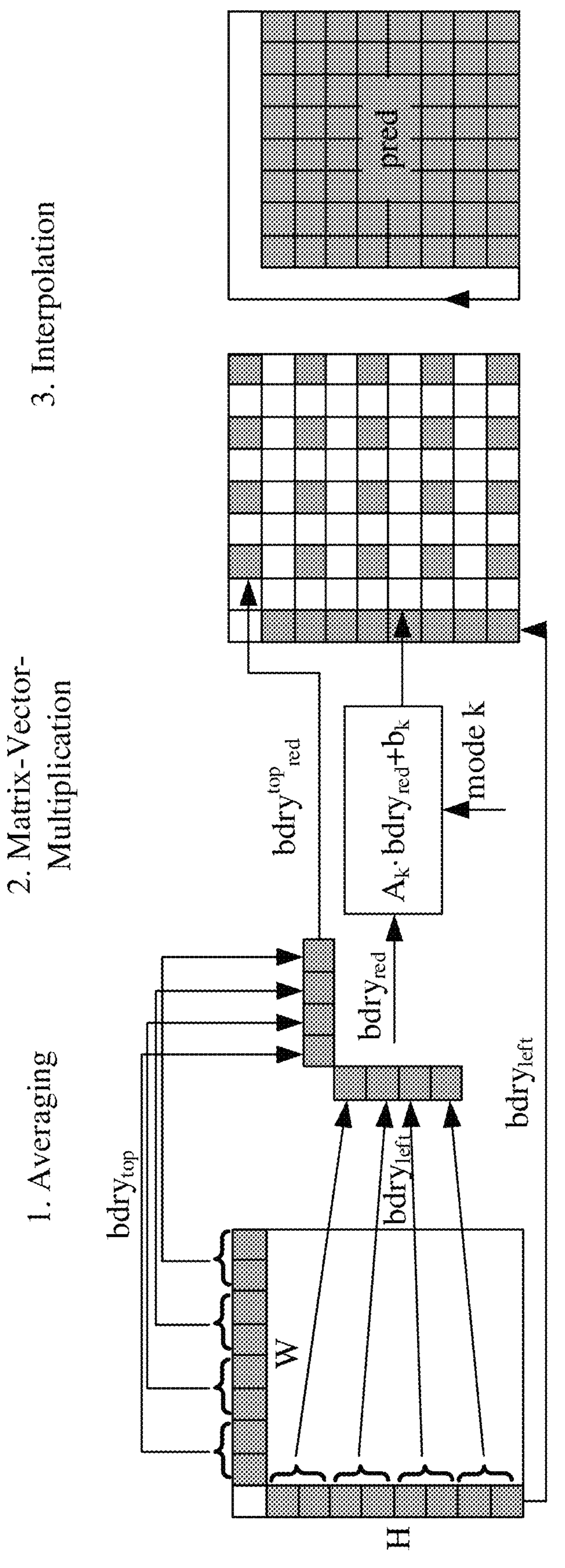
FIG. 1 is a schematic diagram of a matrix-based intra prediction technology.

To better understand features and technical contents of embodiments, the embodiments will be described in detail below with reference to the accompanying drawings. The attached drawings are merely for reference and description, but are not used to limit the embodiments.

In the following description, reference is made to "some embodiments", which describe a subset of all possible embodiments, but it is understood that "some embodiments" can be the same subset or different subsets of all possible embodiments, and can be combined with each other without conflict. It should also be pointed out that the terms "first\second\third" referred to in the embodiments of the disclosure are only used to distinguish similar objects, and do not represent a specific ordering for the objects. It is understood that "first\second\third" can be interchanged with a specific order or a priority order where allowed, so that the embodiments of the disclosure described herein can be implemented in an order other than that illustrated or described herein.

In a picture of a video, a first colour component, a second colour component, and a third colour component are generally indicates a coding block (CB). These three colour components are respectively a luma component, a blue chroma component, and a red chroma component. Specifically, the luma component is generally represented by a symbol Y, the blue chroma component is generally represented by a symbol Cb or U, and the red chroma component is generally represented by a symbol Cr or V. In this way, the picture can be expressed in the format of YCbCr or YUV.

In the embodiments of the disclosure, the first colour component is a luma component, the second colour component is a blue chroma component, and the third colour component is a red chroma component, which is not limited herein.

Universal video coding standards generally use block-based hybrid coding frameworks. Each picture of a video is partitioned into largest coding units (LCUs) or coding tree units (CTUs), which are squares of equal size (e.g., 128×128, 64×64, etc.). Each LCU or CTU can also be partitioned into rectangular coding units (CUs) according to certain rules. Furthermore, the CU can be partitioned into smaller prediction units (PUs), transform units (TUs), etc.

The hybrid coding framework can include modules such as prediction, transform, quantization, entropy coding, and in-loop filter. The prediction module can include intra prediction and inter prediction, and the inter prediction can include motion estimation and motion compensation. Since there is strong correlation among neighbouring samples in a video picture, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus, coding efficiency can be improved.

The basic process performed by a video codec is as follows. At the encoding side, a picture is partitioned into blocks, and a prediction block of a current block is generated using intra prediction or inter prediction. An original block of the current block is subtracted from the prediction block to obtain a residual block, which is then subjected to transformation and quantization to generate a quantization coefficient matrix that is entropy-encoded and signalled into a bitstream. At the decoding side, the prediction block for the current block is generated using intra prediction or inter prediction, and at the same time, the quantization coefficient matrix is decoded from the bitstream. The quantization coefficient matrix is inverse-quantized and inverse-transformed to obtain the residual block, which is added to the prediction block to obtain a reconstructed block. Reconstructed blocks form a reconstructed picture, which is loop-filtered based on the picture or blocks to obtain a decoded picture. The encoding side also requires similar operations to obtain the decoded picture. The decoded picture can be used as a reference picture in inter prediction for subsequent pictures. The block partition information and mode information or parameter information (such as for prediction, transformation, quantization, entropy coding, and in-loop filtering) determined at the encoding side, can need to be output to the bitstream if necessary. The decoding side determines the same block partition information and mode information or parameter information such as for prediction, transformation, quantization, entropy coding, and in-loop filtering as the encoding side through decoding and analysis based on available information, ensuring that the decoded picture obtained by the encoding side is the same as that obtained by the decoding side. The decoded picture obtained by the encoding side is typically called the reconstructed picture. During prediction, the current block can be partitioned into PUs, and during transformation, the current block can be partitioned into TUs. The partition for PUs and TUs can be different. The above is the basic process performed by the video codec under the block-based hybrid coding framework. With the development of technologies, some modules or steps in this framework or process can be optimized. The embodiments of the disclosure are applicable to the basic process performed by the video codec under the block-based hybrid coding framework, but is not limited to this framework or process.

The current block can be the current coding unit (CU) or the current prediction unit (PU), etc.

JVET, an international video coding standard-setting organization, has established a group that goes beyond the research of H.266/VVC model, and named the model, i.e., the platform test software, the enhanced compression model (ECM). The ECM begins to receive newer and more efficient compression algorithms on basis of VTM10.0, and currently surpasses encoding performance of VVC by about 13%. The ECM not only expands the size of the coding unit of the specific resolution, but also integrates many intra and inter prediction technologies.

Hereinafter, a technical solution related to a matrix-based intra prediction (MIP) technology will be described.

The matrix-based intra prediction technology, i.e., MIP technology, can include three main steps, i.e., downsampling, matrix multiplication, and upsampling. In the first step, the spatially neighbouring reconstructed samples are downsampled, and the downsampled sample sequence is taken as an input vector of the second step. In the second step, the output vector of the first step, taken as the input, is multiplied with the preset matrix and then is added with the bias vector, and the calculated sample vector is output. In the third step, the output vector of the second step, taken as the input, is upsampled into a final prediction block. FIG. 1 is a schematic diagram of a matrix-based intra prediction technology. The above process is illustrated in FIG. 1. For the MIP technology, in the first step, the downsampled top neighbouring reconstructed sample vector is obtained by averaging the top neighbouring reconstructed samples of the current coding unit, and the downsampled left neighbouring reconstructed sample vector is obtained by averaging the left neighbouring reconstructed samples of the current coding unit. The top vector and the left vector are used as the input of matrix vector multiplication in the second step, where $A_k$ is the preset matrix, $b_k$ is the preset bias vector, and k is the MIP mode index. In the third step, linear-interpolation upsampling is performed on the result obtained in the second step, to obtain a prediction sample block having the number of samples consistent with the actual number of samples of the coding unit.

The number of MIP prediction modes varies for coding units of different block sizes. Taking H.266/VVC as an example, the MIP has 16 prediction modes for 4×4-sized coding units; the MIP has 8 prediction modes for 8×8-sized coding units or coding units with width and height equal to 4; the MIP has 6 prediction modes for coding units of other sizes. Moreover, the MIP technology has a transpose function. For a prediction mode that matches the current size, for the MIP, the transpose calculation is attempted at the encoding side. If transpose is required, the order of the top input vector and the left input vector is swapped, and the output is swapped after matrix calculation.

Therefore, for the MIP, a flag for indicating whether the MIP technology is enabled for the current coding unit is needed, and if the MIP technology is enabled for the current coding unit, a transpose flag and an MIP mode index are additionally transmitted to the decoding side.

In the VVC standard text, the transpose flag of the MIP is binarized with fixed length (FL) encoding, which has a length of 1. The mode index of the MIP is binarized with truncated binary (TB) encoding.

The low-frequency non-separable transform (LFNST) technology is also a technology adopted in the VVC text, and the related technical solutions of the LFNST will be described below.

The LFNST is applied between forward primary transform and quantization at the encoding side, and between inverse quantization and inverse primary transform at the decoding side. After the residual of the current coding block undergoes the primary transform, the coefficients in the frequency domain are obtained. On this basis, for the LFNST, frequency domain transform is performed on some coefficients, in other words, some coefficients in the frequency domain are transformed to obtain coefficients in another domain. Then, operations such as quantization and entropy coding are performed. The LFNST can further remove statistical redundancy, which has good performance on the reference software VTM of VVC.

For the LFNST, secondary transform is mainly performed on the 4×4 or 8×8 region in the top-left corner of the transform block. In addition, the transform kernels of the LFNST are mainly classified into four transform sets in VVC, and each transform set has two candidate transform kernels. In ECM, the transform kernels of the LFNST are expanded from the original 4 transform sets to 35 transform sets, and from the original 2 candidate transform kernels per transform set to 3 candidate transform kernels per transform set.

The LFNST is allowed to act on intra prediction and inter prediction. The LFNST can save bit overhead by selecting the transform set corresponding to the intra prediction mode in intra prediction. Since intra prediction generally has corresponding intra prediction modes, that is, the DC mode, PLANAR mode, or angular prediction mode, these intra prediction modes and the transform sets of the LFNST are bound. As in VVC, the DC mode and the PLANAR mode correspond to the first transform set, as illustrated in Table 1 below.

TABLE 1

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
| 81 <= IntraPredMode <= 83 | 0 |

predModeIntra can be an intra prediction mode indicator, and SetIdx can be an LFNST index. Herein, the value of the LFNST index is set to indicate whether the LFNST is used for the current block and an index of the LFNST transform kernel in the LFNST transform kernel candidate set. For example, the LFNST transform set includes four transform kernel candidate sets (set0, set1, set2, set3), which correspond to values of SetIdx being 0, 1, 2, and 3, respectively.

Accordingly, after the transform kernels of the LFNST are expanded in the ECM, the LFNST transform sets corresponding to different intra prediction modes will be finer. For example, FIG. 2 is a correspondence table between intra prediction modes and transform sets. As illustrated in FIG. 2, there are 35 transform sets after expansion.

Hereinafter, a technical solution related to a decoder side intra mode derivation (DIMD) technology will be described.

Figure 3:
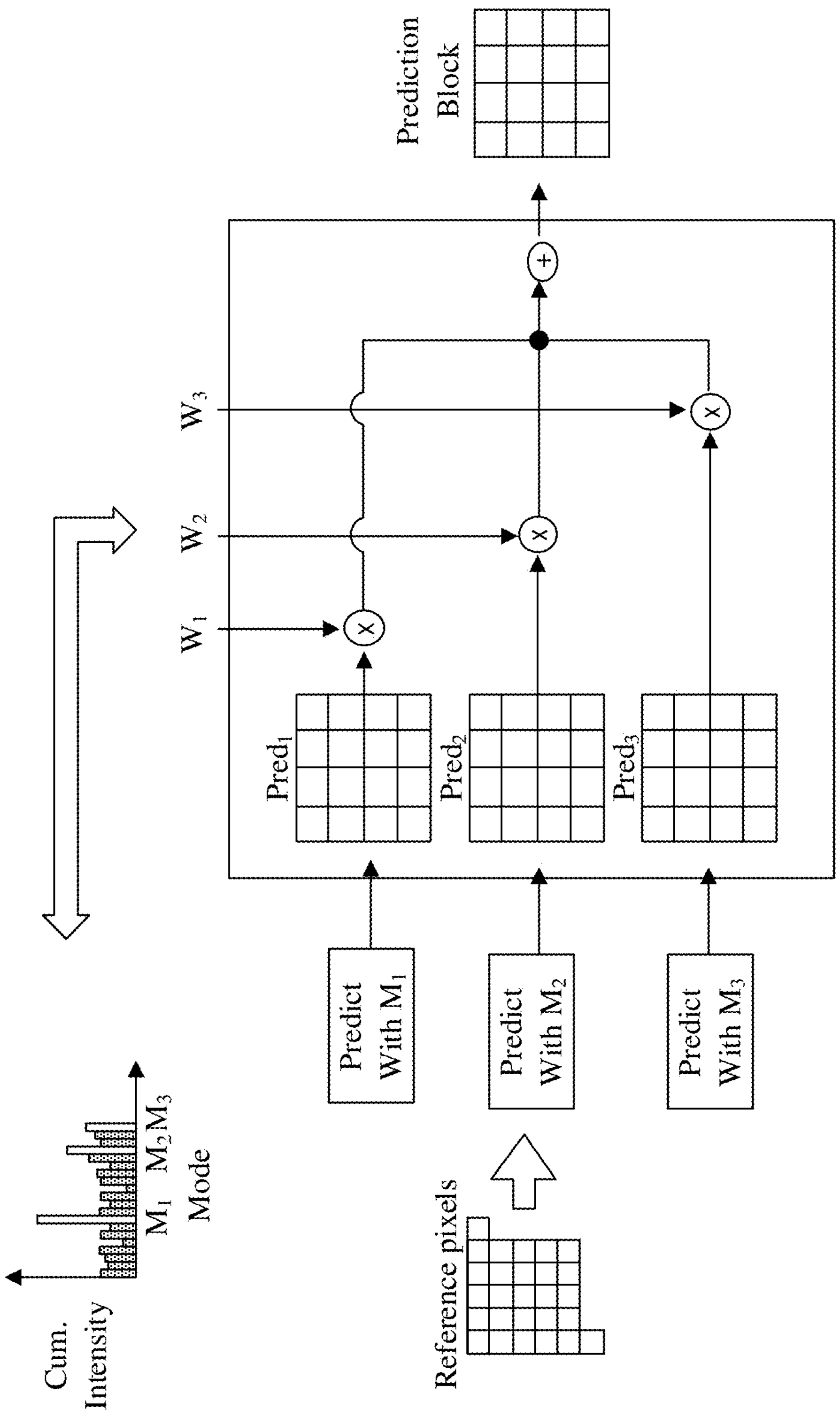
FIG. 3 is a schematic diagram of a decoder side intra mode derivation technology.

DIMD is an intra prediction technology of ECM, and such technology is not included in VVC. The core of this technology is deriving at the decoding side the intra prediction mode by using the same method as the encoding side, to avoid the transmission of the index of the intra prediction mode of the current coding unit in the bitstream, thereby saving bit overhead. Specifically, this technology can include two main steps. At the first step, a prediction mode is derived, where the same prediction mode intensity calculation method is used at both the encoding side and the decoding side. The encoding side uses Sobel operator to calculate the histogram of gradients for each prediction mode. The action region covers the top three rows of neighbouring reconstructed samples, the left three columns of neighbouring reconstructed samples, and the corresponding top-left neighbouring reconstructed samples of the current block. By calculating the histogram of gradients within this L-shaped region, the first prediction mode corresponding to the maximum amplitude and the second prediction mode corresponding to the second-maximum amplitude in the histogram can be obtained. The decoding side derives the first prediction mode and the second prediction mode using the same steps. At the second step, a prediction block is derived, where the same prediction block derivation mode is used at both the encoding side and the decoding side to obtain the current prediction block. The encoding side evaluates the following two conditions: 1) the gradient of the second prediction mode is not 0; and 2) neither the first prediction mode nor the second prediction mode is the PLANAR or DC prediction mode. If both conditions are not simultaneously satisfied, for the current prediction block, only the first prediction mode is used to calculate the prediction sample values of the current block. That is, the regular prediction process is applied to the first prediction mode. Otherwise, if both conditions are satisfied, the current prediction block will be derived using a weighted averaging approach. Specifically, a weight for the PLANAR mode is ⅓. A weight for the first prediction mode is calculated as ⅔ multiplied by the ratio of the gradient intensity of the first prediction mode to the sum of the gradient intensities of the first and second prediction modes. A weight for the second prediction mode is calculated as ⅔ multiplied by the ratio of the gradient intensity of the second prediction mode to the sum of the gradient intensities of the first and second prediction modes. The weighted averaging is performed on above three prediction modes, i.e., PLANAR, the first prediction mode, and the second prediction mode, to obtain the prediction block of the current coding unit. The decoding side obtains the prediction block in the same steps. FIG. 3 is a schematic diagram of a decoder side intra mode derivation technology. The specific operation described above is illustrated in FIG. 3.

In the second step, the specific weight calculation method is illustrated in the following formula:

$$\text{Weight (PLANAR)} = 1/3 \tag{1}$$

$$\text{Weight } (mode1) = 2/3 \times (amp1/(amp1 + amp2)) \tag{2}$$

$$\text{Weight } (mode2) = 1 - \text{Weight (PLANAR)} - \text{Weight } (mode1) \tag{3}$$

mode1 and mode2 represent the first prediction mode and the second prediction mode, respectively, and amp1 and amp2 represent a gradient amplitude value of the first prediction mode and a gradient amplitude value of the second prediction mode, respectively. For the DIMD technology, a flag needs to be transmitted to the decoder to indicate whether the DIMD technology is used for the current coding unit.

To improve the MIP and LFNST, the relationship between the MIP and LFNST is simplified in both VVC and ECM, and all MIP prediction modes are defaulted as the PLANAR mode before mapping to the transform sets of the LFNST. This is because, for the LFNST, in the early stage of design, the intra prediction mode is used as the input of training, and the transform kernel coefficients of the LFNST are obtained through training of deep learning. However, the prediction mode of the MIP is different from the traditional intra prediction mode in representation, where the MIP prediction mode represents a certain prediction matrix coefficient, and the traditional prediction mode represents directivity. Meanwhile, the prediction result of the MIP is similar to that of the traditional PLANAR mode, so for all prediction modes of the MIP, PLANAR is mapped to the transform set of the LFNST.

For the prediction block of the MIP, the gradient amplitude value of each traditional intra prediction mode can be sorted using the DIMD, and the best possible traditional prediction mode can be mapped to the transform set of the LFNST. Meanwhile, the original size range of the coding unit for which the MIP is allowed to use the LFNST is extended. In VVC and ECM, only when the width and height of the current coding unit are both greater than or equal to 16, the MIP is allowed to use the LFNST. After extension, the MIP is allowed to use the LFNST when both the width and height of the current coding unit are equal to or greater than 4.

Although the above method well solves the problem of mapping the MIP prediction mode to the LFNST and improves the encoding efficiency, it introduces the corresponding complexity, such as the coding time in software or the cache and timing problem in hardware implementation.

Moreover, for the expansion of the range in which the MIP is allowed to use the LFNST, and the allowed condition becomes that the LFNST can be used when the width and height are greater than or equal to 4. As such, the range of deriving the traditional prediction mode for the MIP prediction block by using the DIMD is expanded, and the complexity of coding will increase.

Compared with the encoding side, it is more expensive to increase complexity at the decoding side. For the LFNST, the use range of the 4×4-sized coding unit has been supported in the original VVC and ECM, which will not bring additional concerns. However, the DIMD derivation process of the prediction block is a technology and operation that is not currently available in VVC and ECM. If the use conditions of the DIMD can be reduced or the steps can be simplified while maintaining the corresponding encoding performance, the decoding efficiency of the decoding side can be greatly improved.

That is, the common coding solutions based on the DIMD technology will introduce greater complexity in both software and hardware, which increases the compression cost and reduces the encoding efficiency.

To solve the above problem, in embodiments of the disclosure, at a decoding side, a bitstream is decoded to determine a prediction mode parameter. The bitstream is decoded to determine an MIP parameter of a current block, when the prediction mode parameter indicates that MIP is used to determine an intra prediction value. The bitstream is decoded to determine transform coefficients of the current block and an LFNST index of the current block. A mapping mode of an LFNST transform set is determined according to the MIP parameter, when the LFNST index indicates that an LFNST is used for the current block. According to the mapping mode of the LFNST transform set, one LFNST transform kernel candidate set is selected from multiple LFNST transform kernel candidate sets, and an LFNST transform kernel used for the current block is determined from the selected LFNST transform kernel candidate set. The transform coefficients are transformed using the LFNST transform kernel. At an encoding side, a prediction mode parameter is determined. An MIP parameter of a current block is determined, when the prediction mode parameter indicates that MIP is used for the current block to determine an intra prediction value. An intra prediction block of the current block is determined according to the MIP parameter, and a residual block obtained by subtracting the intra prediction value from the current block is calculated. A mapping mode of an LFNST transform set is determined according to the MIP parameter, when an LFNST is used for the current block. According to the mapping mode of the LFNST transform set, one LFNST transform kernel candidate set is selected from multiple LFNST transform kernel candidate sets, an LFNST transform kernel used for the current block is determined from the selected LFNST transform kernel candidate set, and an LFNST index is set and the LFNST index is signaled into a video bitstream. The residual block is transformed using the LFNST transform kernel. Therefore, in embodiments of the disclosure, in deriving the prediction block, according to a size parameter in the MIP parameter of the current block, the mapping mode of the LFNST transform set is determined, and for a larger-sized picture block, DIMD is not used to derive the mapping mode, which can reduce the computational complexity and improve the encoding efficiency.

Figure 4:
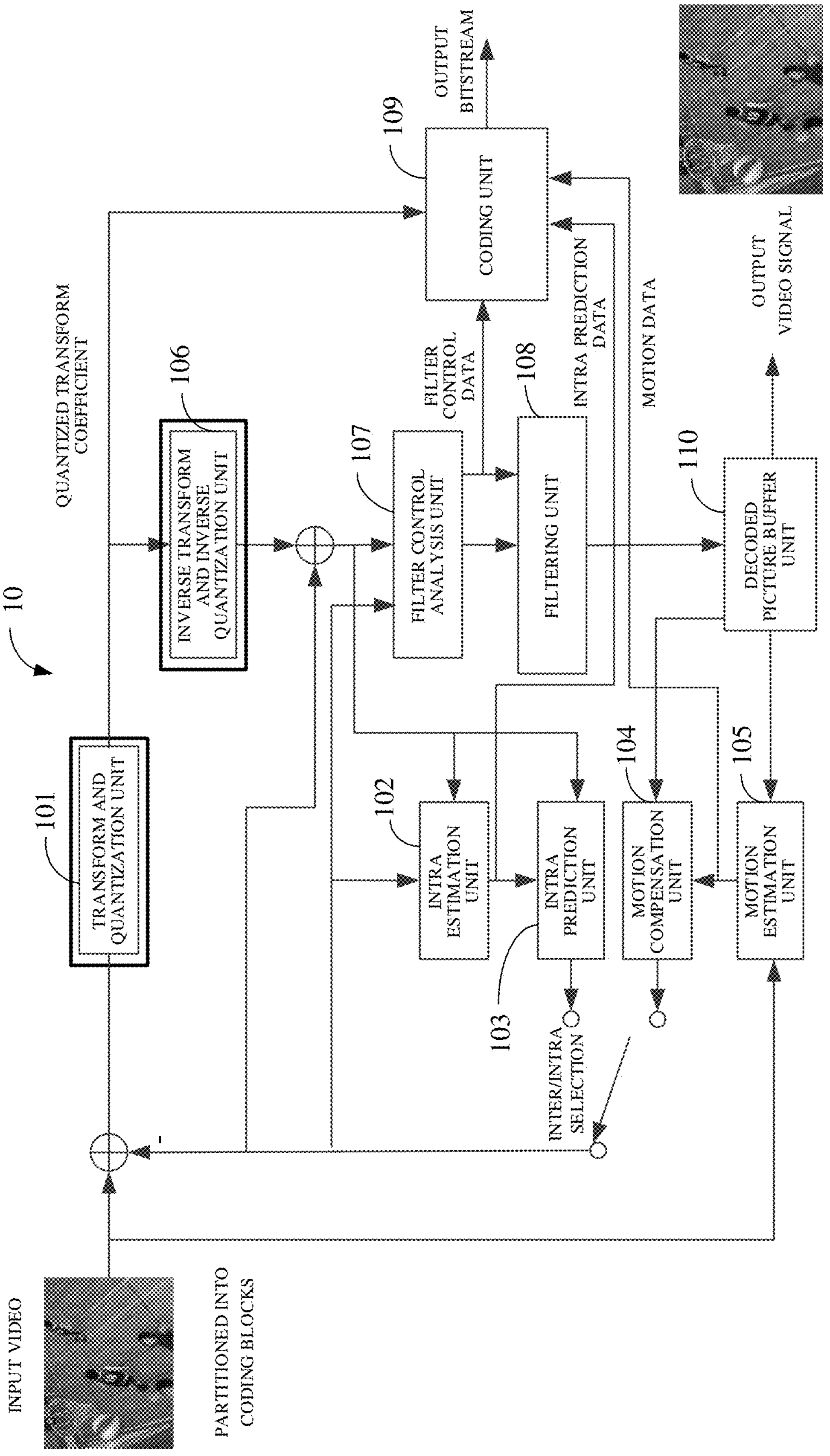
FIG. 4 is a block diagram of a video encoding system according to embodiments of the disclosure.

FIG. 4 is a block diagram of a structure of a video encoding system. Referring to FIG. 4, it illustrates an example of the block diagram of the structure of the video encoding system provided in the embodiments of the disclosure. As illustrated in FIG. 4, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a coding unit 109, and a decoded picture buffer unit 110, etc. The filtering unit 108 can implement deblocking filtering and sample adaptive offset (SAO) filtering, and the coding unit 109 can implement header information encoding and context-based adaptive binary arithmetic coding (CABAC). For an input original video signal, one coding block of a video can be obtained through partition of a coding tree unit (CTU). Then, for the residual sample information obtained after intra prediction or inter prediction, the coding block is transformed by the transform and quantization unit 101, including transforming the residual information from the pixel domain to the transform domain, and the obtained transform coefficients are quantized, to further reduce the bit rate. The intra estimation unit 102 and the intra prediction unit 103 are used to perform intra prediction on the coding block. Specifically, the intra estimation unit 102 and the intra prediction unit 103 are used to determine an intra prediction mode to-be-used to encode the coding block. The motion compensation unit 104 and the motion estimation unit 105 are used to perform inter prediction on the received coding block relative to one or more blocks in one or more reference pictures, to provide temporal prediction information. The motion estimation performed by the motion estimation unit 105 is a process of generating a motion vector, where the motion vector can estimate motion of the coding block. The motion compensation unit 104 is used to perform motion compensation based on the motion vector determined by the motion estimation unit 105. After the intra prediction mode is determined, the intra prediction unit 103 is used to provide the selected intra prediction data to the coding unit 109 and the motion estimation unit 105 is used to send the calculated motion vector data to the coding unit 109. In addition, the inverse transform and inverse quantization unit 106 is used for reconstruction of the coding block. A residual block is reconstructed in the pixel domain, and blockiness artifacts of the reconstructed residual block are removed through the filter control analysis unit 107 and the filtering unit 108, and then the reconstructed residual block is added to a prediction of the picture in the decoded picture buffer unit 110, to generate a reconstructed coding block. The coding unit 109 is used to encode various coding parameters and quantized transform coefficients. In the CABAC-based encoding algorithm, the context can be based on neighbouring coding blocks, and the coding unit 109 can be used to encode information indicating the determined intra prediction mode and output the bitstream of the video signal. The decoded picture buffer unit 110 is used to store reconstructed coding blocks, for prediction reference. As the picture encoding progresses, reconstructed coding blocks will be continuously generated, and these reconstructed coding blocks will be stored into the decoded picture buffer unit 110.

Figure 5:
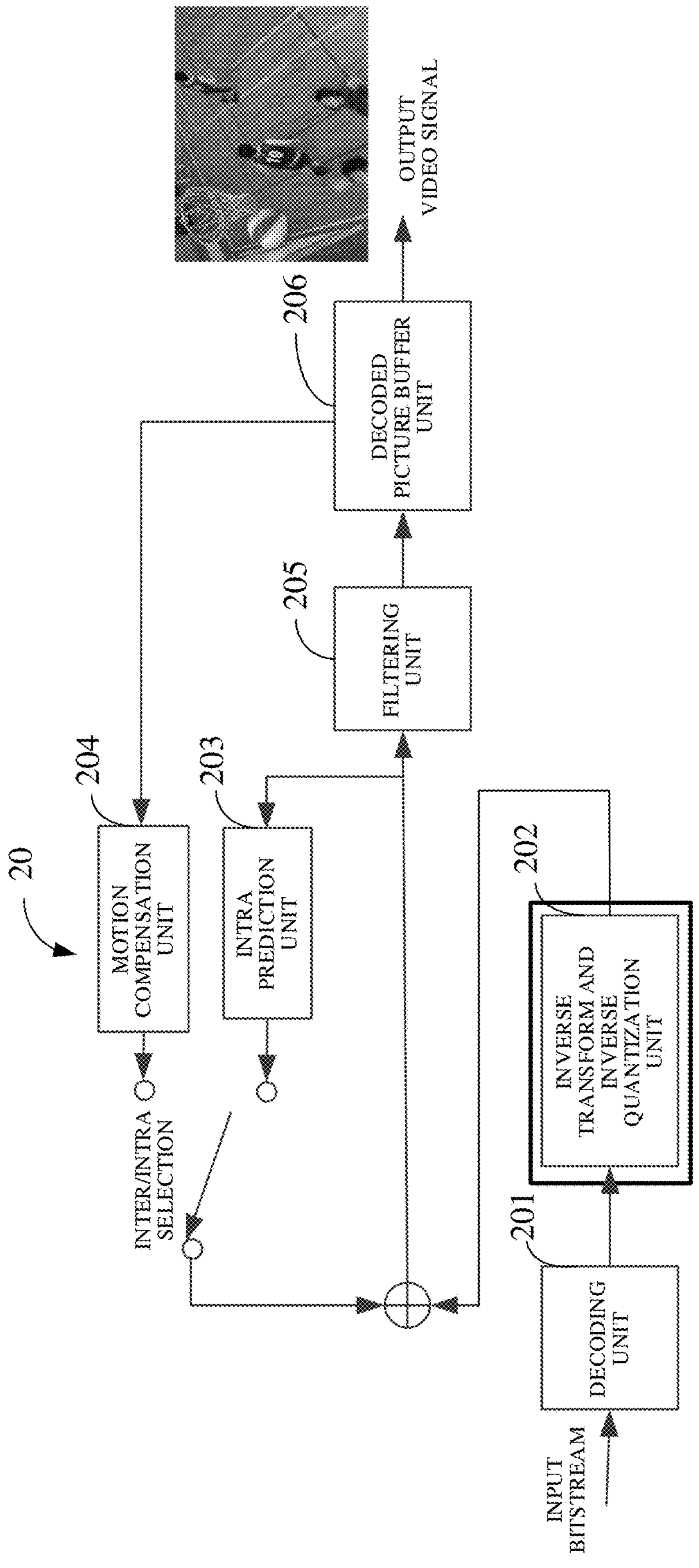
FIG. 5 is a block diagram of a video decoding system according to embodiments of the disclosure.

Referring to FIG. 5, it illustrates an example of the block diagram of the structure of the video decoding system provided in the embodiments of the disclosure. As illustrated in FIG. 5, the video decoding system 20 includes a decoding unit 201, an inverse transform and inverse quantization unit 202, an intra prediction unit 203, a motion compensation unit 204, a filtering unit 205, a decoded picture buffer unit 206, and the like. The decoding unit 201 can implement header information decoding and CABAC, and the filtering unit 205 can implement deblocking filtering and SAO filtering. After the input video signal is encoded (as illustrated in FIG. 4), the bitstream of the video signal is output. The bitstream is input into the video decoding system 20. First, decoded transform coefficients are obtained through the decoding unit 201. The decoded transform coefficients are processed by the inverse transform and inverse quantization unit 202, so as to generate a residual block in the pixel domain. The intra prediction unit 203 can be used to generate prediction data of the current coding block of the video based on the determined intra prediction mode and data from the previous decoded block of the current frame or picture. The motion compensation unit 204 is used to determine prediction information for the coding block by analyzing motion vectors and other associated syntax elements, and use the prediction information to generate a prediction of the coding block that is being decoded. The decoded block is formed by summing the residual block from the inverse transform and inverse quantization unit 202 and the corresponding prediction generated by the intra prediction unit 203 or the motion compensation unit 204. The blockiness artifacts of the decoded video signal are removed through the filtering unit 205, which can improve quality of the video. The decoded block is then stored into the decoded picture buffer unit 206. The decoded picture buffer unit 206 is used to store reference pictures used for subsequent intra prediction or motion compensation, and is also used to output the video signal, that is, the restored original video signal is obtained.

The encoding method in embodiments of the disclosure can be applied to the intra estimation unit 102 and the intra prediction unit 103 as illustrated in FIG. 4. Further, the decoding method in embodiments of the disclosure can be applied to the intra prediction unit 203 as illustrated in FIG. 5. That is, the encoding and decoding method in embodiments of the disclosure can be applied to a video encoding system, a video decoding system, or can be applied to both the video encoding system and the video decoding system, which is not limited in embodiments of the disclosure. When the encoding and decoding method is applied to a video encoding system, the "current block" refers to a current coding block in intra prediction. When the encoding and decoding method is applied to a video decoding system, the "current block" refers to the current decoding block in intra prediction.

Hereinafter, the technical solutions in the embodiments of the disclosure will be clearly and completely described with reference to the accompanying drawings in the embodiments of the disclosure.

Figure 6:
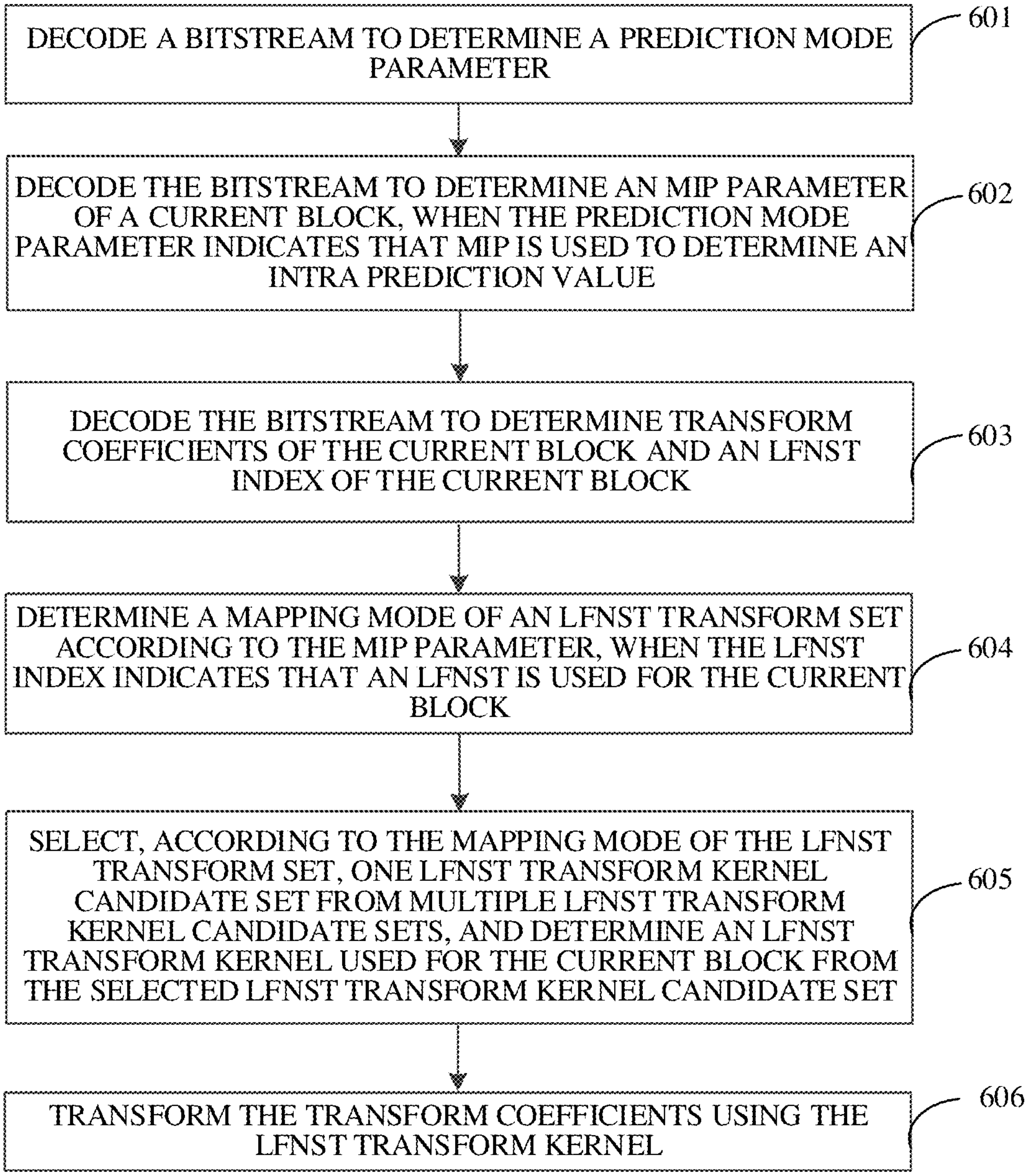
FIG. 6 is a schematic flow chart of a decoding method provided in embodiments of the disclosure.

Embodiments of the disclosure provides a decoding method. FIG. 6 is a schematic flow chart of the decoding method provided in embodiments of the disclosure. As illustrated in FIG. 6, the decoding method performed by a decoder includes the following.

At block 601, a bitstream is decoded to determine a prediction mode parameter.

In embodiments of the disclosure, the decoder can first decode the bitstream to determine the prediction mode parameter.

Note that, in embodiments of the disclosure, the prediction mode parameter indicates a coding mode of a current block and a parameter related to the coding mode. The prediction mode generally includes a traditional intra prediction mode and a non-traditional intra prediction mode, where the traditional intra prediction mode can include a direct current (DC) mode, a PLANAR mode, an angular mode, etc., and the non-traditional intra prediction mode can include an MIP mode and a cross-component linear model prediction (CCLM) mode, an intra block copy (IBC) mode, a Palette (PLT) mode, etc.

It can be understood that in embodiments of the disclosure, at the encoding side, predictive coding can be performed on the current block, and during predictive coding, the prediction mode of the current block can be determined, and the corresponding prediction mode parameter can be signalled into the bitstream. As such, the prediction mode parameter can be transmitted from the encoder to the decoder.

Accordingly, at the decoding side, the bitstream is decoded to obtain the intra prediction mode of the luma or chroma component of the current block or the coding block containing the current block. In this case, the value of predModeIntra (intra prediction mode indicator) can be determined, and the calculation formula is as follows.

$$predModeIntra = (cIdx == 0)\,?\; IntraPredModeY[xTbY][yTbY] : IntraPredModeC[xTbY][yTbY] \tag{4}$$

A colour component indicator (which can be denoted by cIdx) indicates a luma component or a chroma component of the current block. Herein, if the luma component of the current block is predicted, then cIdx is equal to 0; if the chroma component of the current block is predicted, then cIdx is equal to 1. Further, (xTbY, yTbY) are coordinates of the top left corner sample of the current block, IntraPredModeY[xTbY][yTbY] is an intra prediction mode of the luma component, and IntraPredModeC[xTbY][yTbY] is an intra prediction mode of the chroma component.

Further, in embodiments of the disclosure, by obtaining the prediction mode parameter, it is possible to determine based on the prediction mode parameter whether the MIP is used to determine the intra prediction value during intra prediction.

At block 602, the bitstream is decoded to determine an MIP parameter of the current block, when the prediction mode parameter indicates that the MIP is used to determine an intra prediction value.

In embodiments of the disclosure, after the prediction mode parameter is determined, if the prediction mode parameter indicates that the MIP is used to determine the intra prediction value, the bitstream can be further decoded to determine the MIP parameter of the current block.

Note that, in embodiments of the disclosure, the MIP parameter can include parameters such as an MIP transpose indication parameter (which can be represented by isTransposed), an MIP mode index (which can be represented by modeId), a size of the current block, a type of the current block (which can be represented by mipSizeId), and the like. The values of these parameters can be obtained by decoding the bitstream.

That is, in embodiments of the disclosure, the MIP parameter determined by decoding the bitstream can indicate at least one information such as the MIP transpose indication parameter, the MIP mode index, the size of the current block, and the type of the current block.

Further, in embodiments of the disclosure, the value of isTransposed can be determined by decoding the bitstream. When the value of isTransposed is equal to 1, it can be determined that the sample input vector used in MIP mode needs to be transposed. When the value of isTransposed is equal to 0, it can be determined that the sample input vector used in MIP mode does not need to be transposed. That is, the MIP transpose indication parameter isTransposed can indicate whether to transpose the sample input vector used in MIP mode.

Further, in embodiments of the disclosure, the MIP mode index modeId can be determined by decoding the bitstream. The MIP mode index can indicate the MIP mode used for the current block, and the MIP mode can indicate a calculation and derivation method of determining the intra prediction block of the current block with the MIP That is, different MIP modes correspond to different values of MIP mode indexs. Herein, the value of the MIP mode index can be 0, 1, 2, 3, 4, or 5.

Further, in embodiments of the disclosure, by decoding the bitstream, parameter information such as the size of the current block, the aspect ratio of the current block, and the type mipSizeId of the current block can be determined. In this way, after the MIP parameter is determined, it is convenient to subsequently select the LFNST transform kernel (which can be represented by kernel) used for the current block according to the determined MIP parameter.

That is, in embodiments of the disclosure, the MIP parameter can be used to determine the size parameter of the current block, and the size parameter can represent the size of the current block, which can be the height and width of the current block or the aspect ratio of the current block.

At block 603, the bitstream is decoded to determine transform coefficients of the current block and an LFNST index of the current block.

In embodiments of the disclosure, if the prediction mode parameter indicates that the MIP is used to determine the intra prediction value, after the MIP parameter of the current block is determined, the bitstream can be further decoded to determine the transform coefficients and the LFNST index of the current block.

Note that, in embodiments of the disclosure, the value of the LFNST index can indicate whether an LFNST is used for the current block, and can also indicate the index of the LFNST transform kernel in the LFNST transform kernel candidate set.

That is, in embodiments of the disclosure, after the LFNST index is decoded, when the value of the LFNST index is equal to 0, it indicates that the LFNST is not used for the current block. When the value of the LFNST index is greater than 0, it indicates that the LFNST is used for the current block. In this case, the index of the transform kernel can be equal to the value of the LFNST index, or the index of the transform kernel can be equal to the value of the LFNST index minus 1.

At block 604, a mapping mode of an LFNST transform set is determined according to the MIP parameter, when the LFNST index indicates that an LFNST is used for the current block.

In embodiments of the disclosure, after the transform coefficients and the LFNST index of the current block are determined, if the LFNST index indicates that the LFNST is used for the current block, the mapping mode of the LFNST transform set can be further determined according to the MIP parameter.

It is noted that, in embodiments of the disclosure, the MIP parameter can be a size parameter of the current block, and the size parameter can represent the size of the current block, which can be the height and width of the current block or the aspect ratio of the current block.

That is, in embodiments of the disclosure, in determining the mapping mode of the LFNST transform set, reference can be made to the size parameter of the current block. For example, the mapping mode of the LFNST transform set is determined based on the height and width of the current block, or the mapping mode of the LFNST transform set is determined based on the aspect ratio of the current block.

Further, in embodiments of the disclosure, in determining the mapping mode of the LFNST transform set according to the size parameter of the current block, first, whether the size parameter satisfies a first preset condition can be determined. If the size parameter satisfies the first preset condition, the first preset prediction mode can be determined as the mapping mode of the LFNST transform set. If the size parameter does not satisfy the first preset condition, the mapping mode of the LFNST transform set is determined using the DIMD.

It is noted that, in embodiments of the disclosure, the first preset condition can be used to limit the size of the current block. The first preset condition corresponds to the size parameter of the current block. If the size parameter of the current block is the height and the width of the current block, the first preset condition can limit the height and the width respectively. If the size parameter of the current block is the aspect ratio of the current block, the first preset condition can limit the aspect ratio.

For example, in embodiments of the disclosure, assuming that the size parameter of the current block is the height and width of the current block, the first preset condition can be set to: the width being greater than or equal to a preset width threshold and/or the height being greater than or equal to a preset height threshold. For example, if the height of the current block is greater than or equal to the preset height threshold or the width of the current block is greater than or equal to the preset width threshold, it can be determined that the size parameter satisfies the first preset condition. If the height of the current block is less than the preset height threshold and the width of the current block is less than the preset width threshold, it can be determined that the size parameter does not satisfy the first preset condition.

It can be understood that in embodiments of the disclosure, the preset width threshold value and the preset height threshold value can be any value greater than or equal to 0. For example, the preset width threshold value is 32 and the preset height threshold value is also 32, that is, if the height or width of the current block is greater than or equal to 32, it can be determined that the current block satisfies the first preset condition. For example, the preset width threshold value is 32 and the preset height threshold value is 16, that is, if the height of the current block is greater than or equal to 32 or the width of the current block is greater than or equal to 16, it can be determined that the current block satisfies the first preset condition.

It can be understood that in embodiments of the disclosure, the use of the DIMD can be constrained by the first preset condition, that is, only when the size parameter of the current block does not satisfy the first preset condition, the use of the DIMD is allowed to determine the mapping mode of the LFNST transform set.

It can be seen that, in the decoding method provided in embodiments of the disclosure, in determining the mapping mode of the LFNST transform set, the size of the picture block using the DIMD can be constrained with the first preset condition, in other words, the DIMD can be used only for some picture blocks, thereby effectively reducing the computational complexity. For example, only for picture blocks of smaller size, the use of the DIMD is allowed to determine the mapping mode of the LFNST transform set.

Further, in embodiments of the disclosure, if the size parameter of the current block satisfies the first preset condition, the first preset prediction mode can be directly determined as the mapping mode of the LFNST transform set. The first preset prediction mode can be a PLANAR mode or a DC mode.

That is, in embodiments of the disclosure, in determining the mapping mode of the LFNST transform set, in combination with the first preset condition, it is possible to directly set the mapping modes for some picture blocks. For example, the PLANAR mode or the DC mode is directly determined as the mapping mode of the LFNST transform set for a picture block having a larger size.

Further, in embodiments of the disclosure, in determining the mapping mode of the LFNST transform set using the DIMD, at least one intra prediction mode can be traversed first, to determine at least one gradient information corresponding to the current block, and the mapping mode of the LFNST transform set can be determined according to the at least one gradient information. One intra prediction mode corresponds to one gradient information, and the gradient information can be a gradient histogram.

It can be understood that, in embodiments of the disclosure, in determining the mapping mode of the LFNST transform set according to the at least one gradient information, a gradient amplitude value corresponding to each intra prediction mode can be determined based on the at least one gradient information. An intra prediction mode with a largest gradient amplitude value among the at least one intra prediction mode can then be determined as the mapping mode of the LFNST transform set. One intra prediction mode corresponds to one gradient amplitude value.

That is, in embodiments of the disclosure, based on the DIMD technology, it is possible to derive the intra prediction mode at the decoding side by using the same method as the encoding side to save bit overhead. It mainly includes two steps. At the first step, a prediction mode is derived, where the same prediction mode intensity calculation method is used at both the encoding side and the decoding side. For example, the Sobel operator is used to calculate the histogram of gradients for each prediction mode. The action region is a L-shaped region consist of the top three rows of neighbouring reconstructed samples, the left three columns of neighbouring reconstructed samples, and the corresponding top-left neighbouring reconstructed samples of the current block. By calculating the histogram of gradients within this L-shaped region, the first prediction mode corresponding to the maximum amplitude and the second prediction mode corresponding to the second-maximum amplitude in the histogram can be obtained. At the second step, a prediction block is derived, where the same prediction block derivation mode is used at both the encoding side and the decoding side to obtain the current prediction block. For example, the following two conditions are evaluated: 1) the gradient of the second prediction mode is not 0; and 2) neither the first prediction mode nor the second prediction mode is the PLANAR or DC prediction mode. If both conditions are not simultaneously satisfied, for the current prediction block, only the first prediction mode is used to calculate the prediction sample values of the current block. That is, the regular prediction process is applied to the first prediction mode. Otherwise, if both conditions are satisfied, the current prediction block will be derived using a weighted averaging approach. Specifically, a weight for the PLANAR mode is ⅓. A weight for the first prediction mode is calculated as ⅔ multiplied by the ratio of the gradient intensity of the first prediction mode to the sum of the gradient intensities of the first and second prediction modes. A weight for the second prediction mode is calculated as ⅔ multiplied by the ratio of the gradient intensity of the second prediction mode to the sum of the gradient intensities of the first and second prediction modes. The weighted averaging is performed on above three prediction modes, i.e., PLANAR, the first prediction mode, and the second prediction mode, to obtain the prediction block of the current coding unit. The decoding side obtains the prediction block in the same steps.

Further, in embodiments of the disclosure, first, a downsampling vector of the current block can be determined according to the MIP parameter. Then, matrix multiplication calculation is performed according to the downsampling vector, to obtain an MIP output vector. An MIP prediction block of the current block is determined according to the MIP output vector. Finally, for the MIP prediction block, the at least one intra prediction mode is traversed to obtain at least one gradient information.

It can be understood that in embodiments of the disclosure, Haar-downsampling can be performed on the acquired neighbouring reference reconstructed samples according to the size parameter of the current block, and the sampling step size is determined by the size parameter of the current block. The concatenation order of downsampled top reference reconstructed samples and downsampled left reference reconstructed samples is adjusted according to the decoded MIP transpose indication parameter. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained according to the decoded MIP mode index, and are calculated with the input (downsampling vector), to obtain the output vector (MIP output vector). Then, according to the number of samples of the output vector and the size parameter of the current block, whether to upsample the output vector is determined. If upsampling is not needed, the vector is arranged in sequence in a horizontal direction to be output as the MIP prediction block of the current block. If upsampling is needed, the vector is upsampled in the horizontal direction and then is upsampled in a vertical direction, and the vector is upsampled to the same size as that of the current block and to be output as the MIP prediction block of the current block.

Then, if the DIMD is determined to be used for the current block, the DIMD method is directly used for the MIP prediction block of the current block to derive the optimal traditional intra prediction mode as the mapping mode of the LFNST transform set. That is, the at least one intra prediction mode is traversed for the MIP prediction block of the current block, to calculate the gradient information of the at least one intra prediction mode for the MIP prediction block of the current block.

That is, in embodiments of the disclosure, the DIMD calculation process can be performed after upsampling of the MIP output vector.

Further, in embodiments of the disclosure, first, a downsampling vector of the current block can be determined according to the MIP parameter. Then, matrix multiplication calculation is performed according to the downsampling vector to obtain an MIP output vector. Finally, for the MIP output vector, the at least one intra prediction mode is traversed to obtain the at least one gradient information.

It can be understood that in embodiments of the disclosure, Haar-downsampling can be performed on the acquired neighbouring reference reconstructed samples according to the size parameter of the current block, and the sampling step size is determined by the size parameter of the current block. The concatenation order of downsampled top reference reconstructed samples and downsampled left reference reconstructed samples is adjusted according to the MIP transpose indication parameter obtained by decoding. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained according to the decoded MIP mode index, and are calculated with the input (downsampling vector), to obtain the output vector (MIP output vector).

Then, if the DIMD is determined to be used for the current block, the DIMD method is directly used for the MIP output vector of the current block to derive the optimal traditional intra prediction mode as the mapping mode of the LFNST transform set. That is, the at least one intra prediction mode is traversed for the MIP output vector, to calculate the gradient information of the at least one intra prediction mode for the MIP prediction block of the current block. Then, according to the number of samples of the output vector (MIP output vector) and the size parameter of the current block, whether to upsample the output vector is determined. If upsampling is not needed, the vector is arranged in sequence in a horizontal direction to output as the MIP prediction block of the current block. If upsampling is needed, the vector is upsampled in the horizontal direction and then is upsampled in a vertical direction, to upsample to the same size as that of the current block, to output as the MIP prediction block of the current block.

That is, in embodiments of the disclosure, the DIMD calculation process can be performed before upsampling of the MIP output vector.

It is noted that, in embodiments of the disclosure, in determining the mapping mode of the LFNST transform set by using the DIMD, all 67 intra prediction modes can be traversed to obtain 67 corresponding gradient information. Alternatively, some intra prediction modes among all 67 intra prediction modes can be traversed to obtain corresponding gradient information.

That is, in embodiments of the disclosure, to further reduce the complexity of the encoding and decoding sides, for the use of the DIMD, 67 intra prediction modes can be selectively skipped, to reduce the number of traversed intra prediction modes. For example, selection can be performed with a step size of 1.

At block 605, according to the mapping mode of the LFNST transform set, one LFNST transform kernel candidate set is selected from multiple LFNST transform kernel candidate sets, and an LFNST transform kernel used for the current block is determined from the selected LFNST transform kernel candidate set.

In embodiments of the disclosure, if the LFNST index indicates that the LFNST is used for the current block, after the mapping mode of the LFNST transform set is determined according to the MIP parameter, one LFNST transform kernel candidate set can be selected from the multiple LFNST transform kernel candidate sets according to the mapping mode of the LFNST transform set, and then the LFNST transform kernel used for the current block can be determined from the selected LFNST transform kernel candidate set.

Further, in embodiments of the disclosure, in determining the LFNST transform kernel used for the current block, an index of the mapping mode of the LFNST transform set can be determined first. Then, according to a value of the index, a value of an LFNST intra prediction mode index can be determined. One LFNST transform kernel candidate set can be selected from the multiple LFNST transform kernel candidate sets according to the value of the LFNST intra prediction mode index. Finally, a transform kernel indicated by the LFNST index can be selected from the selected LFNST transform kernel candidate set and set as the LFNST transform kernel used for the current block.

That is, in embodiments of the disclosure, after the mapping mode of the LFNST transform set is determined, the index of the mapping mode of the LFNST transform set can be further determined, and then the value of the index of the mapping mode of the LFNST transform set can be converted into the value of the LFNST intra prediction mode index (which can be represented by predModeIntra). Then, according to the value of predModeIntra, one LFNST transform kernel candidate set is selected from the multiple LFNST transform kernel candidate sets to determine the transform kernel candidate set. From the selected LFNST transform kernel candidate set, the transform kernel indicated by the LFNST index is selected and set as the LFNST transform kernel used for the current block.

Note that, in embodiments of the disclosure, in determining the LFNST transform kernel candidate set and the corresponding LFNST transform kernel, the multiple LFNST transform kernel candidate sets can include four LFNST transform kernel candidate sets, where each LFNST transform kernel candidate set includes two LFNST transform kernels. Accordingly, the value of the LFNST intra prediction mode index corresponding to the value of the index can be determined using a first look-up table.

It can be understood that in embodiments of the disclosure, the DC mode, the PLANAR mode, or the angular prediction mode and the transform sets of the LFNST can be bound based on the first look-up table, such as the first look-up table illustrated in Table 1.

Note that, in embodiments of the disclosure, in determining the LFNST transform kernel candidate set and the corresponding LFNST transform kernel, the multiple LFNST transform kernel candidate sets can include 35 LFNST transform kernel candidate sets, where each LFNST transform kernel candidate set includes 3 LFNST transform kernels. Accordingly, the value of the LFNST intra prediction mode index corresponding to the value of the index can be determined using a second look-up table.

It can be understood that in embodiments of the disclosure, based on the second look-up table, the LFNST transform sets corresponding to different intra prediction modes can be finer, for example, the second look-up table illustrated in FIG. 2.

Further, in embodiments of the disclosure, the MIP parameter can further include an MIP transpose indication parameter, where a value of the MIP transpose indication parameter indicates whether to transpose a sample input vector used in the MIP mode. Accordingly, when the value of the MIP transpose indication parameter indicates to transpose the sample input vector used in the MIP mode, the matrix-transpose can be performed on the transform kernel indicated by the LFNST index to obtain the LFNST transform kernel used for the current block.

It can be understood that, in embodiments of the disclosure, when the value of the MIP transpose indication parameter is equal to 1, it can be considered that the value of the MIP transpose indication parameter indicates to transpose the sample input vector used in the MIP mode. In this case, the corresponding matrix-transpose is performed on the selected transform kernel, so that the LFNST transform kernel used for the current block can be obtained.

At block 606, the transform coefficients are transformed using the LFNST transform kernel.

In embodiments of the disclosure, after one LFNST transform kernel candidate set is selected from the multiple LFNST transform kernel candidate sets according to the mapping mode of the LFNST transform set and the LFNST transform kernel used for the current block is determined from the selected LFNST transform kernel candidate set, the LFNST transform kernel can be used to transform the transform coefficients.

Further, in embodiments of the disclosure, the LFNST transform kernel determined from the selected LFNST transform kernel candidate set is the LFNST transform kernel used for the current block, and the LFNST transform kernel can be a transform matrix for transforming the transform coefficients. Furthermore, the secondary transform coefficient vector, taken as the input, can be multiplied with the transform matrix (transform kernel), to obtain the primary transform coefficient vector. As such, after matrix calculation, the transformation of the transform coefficients can be achieved.

Exemplarily, in a possible embodiment, at the decoding side, the decoder can decode a type flag in coding-unit-level, and if it indicates the intra mode, the decoder can decode to obtain an MIP enable flag (prediction mode parameter), where the flag can be a sequence-level flag and indicates whether the MIP technology is currently enabled for the decoder. The sequence-level flag can be expressed in the form of sps_mip_enable_flag.

Next, if the MIP enable flag is true, an MIP usage flag of the current coding unit (current block) is decoded. Otherwise, in the current decoding process, there is no need to decode the MIP usage flag in coding-unit-level, which is defaulted to false.

If the MIP usage flag of the current coding unit is true, the MIP parameter of the current coding unit is obtained by decoding, where the MIP parameter can include at least one information such as an MIP transpose indication parameter, an MIP mode index, a size of the current block, a type of the current block, and the like. Otherwise, information such as usage flags or indexes of other intra prediction technologies is further decoded, and the final prediction block of the current coding unit is obtained according to the decoded information.

After the MIP parameter is obtained by decoding, Haar-downsampling can be performed on the acquired neighbouring reference reconstructed samples according to the size of the current coding unit (the size parameter of the current block), and the sampling step size is determined according to the size of the coding unit. In combination with the decoded MIP transpose indication parameter, the concatenation order of downsampled top reference reconstructed samples and downsampled left reference reconstructed samples is adjusted. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained according to the decoded MIP prediction mode, and are calculated with the input (downsampling vector), to obtain the output vector (MIP output vector). Then, according to the number of samples of the output vector and the size parameter of the current coding unit, whether to upsample the output vector is determined. If upsampling is not needed, the vector is arranged in sequence in a horizontal direction to output as the prediction block of the current coding unit (the MIP prediction block of the current block). If upsampling is needed, the vector is upsampled in the horizontal direction and then is upsampled in a vertical direction, to upsample to the same size as that of the current coding unit, to output as the prediction block of the current coding unit (the MIP prediction block of the current block).

Note that, if the size parameter of the current block satisfies the first preset condition, the first preset prediction mode is directly determined as the mapping mode of the LFNST transform set. For example, if the width and height of the current coding unit are both greater than or equal to 32, the PLANAR mode (first preset prediction mode) can be used as the mapping mode of the LFNST transform set. If the size parameter of the current block satisfies the first preset condition, the DIMD method is used for the current MIP prediction block to derive the optimal traditional intra prediction mode as the mapping mode of the LFNST transform set.

Further, when the DIMD method is used to derive the traditional intra prediction mode as the mapping mode of the LFNST transform set, for the current MIP prediction block, 67 intra prediction modes (or part of the intra prediction modes) in the current VVC and ECM are traversed, to calculate the gradient information of each intra prediction mode for the current MIP prediction block. Then, the corresponding gradient amplitude value is determined based on the gradient information. The traversed intra prediction mode is sorted according to the gradient amplitude value, and the intra prediction mode with the maximum amplitude is the optimal mode, that is, the mapping mode of the LFNST transform set in the inverse transformation in the subsequent step.

After the mapping mode of the LFNST transform set is determined, information such as usage flags or indexes of other intra prediction technologies can be further decoded, and the final prediction block of the current coding unit is obtained according to the decoded information. Further, the bitstream can be decoded to obtain residual information, the residual information is subjected to inverse quantization and inverse transformation to obtain the time domain residual information, and the final prediction block and the time domain residual information can be added to obtain the reconstructed sample block. After all the reconstructed sample blocks are subjected to loop filtering and other technologies, the final reconstructed picture is obtained, which can be used as video output or reference for subsequent decoding.

Exemplarily, in another possible embodiment, at the decoding side, the decoder can decode a type flag in coding-unit-level, and if it indicates the intra mode, the decoder can decode to obtain an MIP enable flag (prediction mode parameter), where the flag can be a sequence-level flag and indicates whether the MIP technology is currently enabled for the decoder. The sequence-level flag can be expressed in the form of sps_mip_enable_flag.

Next, if the MIP enable flag is true, an MIP usage flag of the current coding unit (current block) is decoded. Otherwise, in the current decoding process, there is no need to decode the MIP usage flag in coding-unit-level, which is defaulted to false.

If the MIP usage flag of the current coding unit is true, the MIP parameter of the current coding unit is obtained by decoding, where the MIP parameter can include at least one information such as an MIP transpose indication parameter, an MIP mode index, a size of the current block, a type of the current block, and the like. Otherwise, information such as usage flags or indexes of other intra prediction technologies is further decoded, and the final prediction block of the current coding unit is obtained according to the decoded information.

After the MIP parameter is obtained by decoding, Haar-downsampling can be performed on the acquired neighbouring reference reconstructed samples according to the size of the current coding unit (the size parameter of the current block), and the sampling step size is determined according to the size of the coding unit. In combination with the decoded MIP transpose indication parameter, the concatenation order of downsampled top reference reconstructed samples and downsampled left reference reconstructed samples is adjusted. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained according to the decoded MIP prediction mode, and are calculated with the input (downsampling vector), to obtain the output vector (MIP output vector).

Note that, if the size parameter of the current block satisfies the first preset condition, the first preset prediction mode is directly determined as the mapping mode of the LFNST transform set. For example, if the width and height of the current coding unit are both greater than or equal to 32, the PLANAR mode (first preset prediction mode) can be used as the mapping mode of the LFNST transform set. If the size parameter of the current block satisfies the first preset condition, the DIMD method is used for the current MIP output vector to derive the optimal traditional intra prediction mode as the mapping mode of the LFNST transform set.

Further, when the DIMD method is used to derive the traditional intra prediction mode as the mapping mode of the LFNST transform set, for the current MIP output vector (MIP output vector), 67 intra prediction modes (or part of the intra prediction modes) in the current VVC and ECM are traversed, to calculate the gradient information of each intra prediction mode for the current MIP output vector. Then, the corresponding gradient amplitude value is determined based on the gradient information. The traversed intra prediction mode is sorted according to the gradient amplitude value, and the intra prediction mode with the maximum amplitude is the optimal mode, that is, the mapping mode of the LFNST transform set in the inverse transformation in the subsequent step.

Further, according to the number of samples of the output vector and the size parameter of the current coding unit, whether to upsample the output vector is determined. If upsampling is not needed, the vector is arranged in sequence in a horizontal direction to output as the prediction block of the current coding unit (the MIP prediction block of the current block). If upsampling is needed, the vector is upsampled in the horizontal direction and then is upsampled in a vertical direction, to upsample to the same size as that of the current coding unit, to output as the prediction block of the current coding unit (the MIP prediction block of the current block).

After the mapping mode of the LFNST transform set is determined, information such as usage flags or indexes of other intra prediction technologies can be further decoded, and the final prediction block of the current coding unit is obtained according to the decoded information. Further, the bitstream can be decoded to obtain residual information, the residual information is subjected to inverse quantization and inverse transformation to obtain the time domain residual information, and the final prediction block and the time domain residual information can be added to obtain the reconstructed sample block. After all the reconstructed sample blocks are subjected to loop filtering and other technologies, the final reconstructed picture is obtained, which can be used as video output or reference for subsequent decoding.

It is noted that the encoding and decoding method provided in embodiments of the disclosure is applicable to the intra prediction at the encoding and decoding side. After the solution provided in embodiments of the disclosure is integrated into JVET-Z008, the test results under the general test condition AI are as illustrated in Tables 2 and 3.

TABLE 2

| | All Intra Main10 Over JVET-Z0048 | | | | |
|---|---|---|---|---|---|
| | Y | U | V | EncT | DecT |
| Class A1 | # VALUE! | # VALUE! | # VALUE! | # NUM! | # NUM! |
| Class A2 | # VALUE! | # VALUE! | # VALUE! | # NUM! | # NUM! |
| Class B | 0.01% | 0.00% | 0.07% | 102% | 106% |
| Class C | 0.00% | 0.04% | 0.07% | 103% | 107% |
| Class E | 0.00% | 0.05% | 0.07% | 105% | 108% |
| Overall | # VALUE! | # VALUE! | # VALUE! | # NUM! | # NUM! |
| Class D | 0.00% | −0.04% | 0.06% | 105% | 111% |
| Class F | # VALUE! | # VALUE! | # VALUE! | # NUM! | # NUM! |

TABLE 3

| | Random access Main10 Over JVET-Z0048 | | | | |
|---|---|---|---|---|---|
| | Y | U | V | EncT | DecT |
| Class A1 | # VALUE! | # VALUE! | # VALUE! | # DIV/0! | # DIV/0! |
| Class A2 | # VALUE! | # VALUE! | # VALUE! | # DIV/0! | # DIV/0! |
| Class B | # VALUE! | # VALUE! | # VALUE! | # NUM! | # NUM! |
| Class C | 0.01% | −0.20% | 0.03% | 100% | 89% |
| Class E | | | | | |
| Overall | # VALUE! | # VALUE! | # VALUE! | # DIV/0! | # DIV/0! |
| Class D | −0.01% | −0.02% | −0.01% | 98% | 85% |
| Class F | # VALUE! | # VALUE! | # VALUE! | # NUM! | # NUM! |

With the solution provided in embodiments of the disclosure, both anchor and test are run on class D, which provides more accurate results, as illustrated in Table 4 and Table 5 below.

TABLE 4

| | All intra Main10 Over JVET-Z0048 | | | | |
|---|---|---|---|---|---|
| | Y | U | V | EncT | DecT |
| Class D | 0.00% | −0.04% | 0.06% | 100% | 100% |

TABLE 5

| | Random access Main10 Over JVET-Z0048 | | | | |
|---|---|---|---|---|---|
| | Y | U | V | EncT | DecT |
| Class D | −0.01% | −0.02% | −0.01% | 100% | 98% |

With the solution provided in embodiments of the disclosure, the test results (of JVET-Z0048+ provided method) using ECM4.0 as anchor are as follows in Table 6.

TABLE 6

| | All Intra Main10 Over ECM4.0 | | | | |
|---|---|---|---|---|---|
| | Y | U | V | EncT | DecT |
| Class A1 | # VALUE! | # VALUE! | # VALUE! | # NUM! | # NUM! |
| Class A2 | # VALUE! | # VALUE! | # VALUE! | # NUM! | # NUM! |
| Class B | −0.08% | −0.05% | 0.03% | 107% | 106% |
| Class C | −0.13% | −0.07% | −0.04% | 107% | 107% |
| Class E | −0.15% | −0.05% | −0.06% | 110% | 107% |
| Overall | # VALUE! | # VALUE! | # VALUE! | # NUM! | # NUM! |
| Class D | −0.12% | −0.06% | −0.18% | 110% | 110% |
| Class F | # VALUE! | # VALUE! | # VALUE! | # NUM! | # NUM! |

As can be seen from the above test results, according to the decoding method provided in embodiments of the disclosure, the complexity of software and hardware in the JVET-Z0048 solution is reduced while similar performance is maintained, for example, there is no change in performance of the luma component. Compared to ECM4.0, it maintains the same performance as JVET-Z0048.

Further, in embodiments of the disclosure, considering that the hardware decoder has different requirements for the I frame and the B frame, the decoding method provided in embodiments of the disclosure can be used only for the B frame, or can be used for both the I frame and the B frame. Alternatively, the decoding method provided in embodiments of the disclosure can be used only for the I frame. Alternatively, the conditions under which the decoding method provided in embodiments of the disclosure is allowed to be used are different for the B frame or the I frame. For example, for the I frame, coding units of all sizes are allowed to use the decoding method provided in embodiments of the disclosure, while for the B frame, only coding units of small size are allowed to use the decoding method provided in embodiments of the disclosure.

Further, in embodiments of the disclosure, if the MIP prediction mode is used for the luma component of the current coding unit (current block) and both the MIP prediction mode and the traditional intra prediction mode are not used for the chroma component, the LFNST transform set of the chroma component can inherit the LFNST transform set of the luma component.

Further, in embodiments of the disclosure, if the traditional intra prediction mode is not used for the current coding unit (current block), the LFNST transform sets of both the luma and chroma component can be solved according to the decoding method provided in embodiments of the disclosure.

In conclusion, the decoding method provided in embodiments of the disclosure relates to a method of deriving the MIP prediction block using the DIMD and mapping the LFNST transform set. On the one hand, the size of coding units using the DIMD is limited. For larger picture blocks, upsampling of the MIP output vector is more complex and the direction information is not obvious, so the process of deriving the traditional prediction mode using the DIMD is skipped to reduce the computational complexity. On the other hand, on the basis of limiting the size of coding units using the DIMD, the computational complexity is further reduced, for example, the MIP output vector before upsampling is used as the input of the DIMD to derive the optimal traditional intra prediction mode.

The decoding method is provided in embodiments of the disclosure. At the decoding side, the bitstream is decoded to determine the prediction mode parameter. The bitstream is decoded to determine the MIP parameter of the current block, when the prediction mode parameter indicates that the MIP is used to determine the intra prediction value. The bitstream is decoded to determine the transform coefficients of the current block and the LFNST index of the current block. The mapping mode of the LFNST transform set is determined according to the MIP parameter, when the LFNST index indicates that the LFNST is used for the current block. According to the mapping mode of the LFNST transform set, one LFNST transform kernel candidate set is selected from the multiple LFNST transform kernel candidate sets, and the LFNST transform kernel used for the current block is determined from the selected LFNST transform kernel candidate set. The transform coefficients are transformed using the LFNST transform kernel. Therefore, in embodiments of the disclosure, in deriving the prediction block, according to the size parameter in the MIP parameter of the current block, the mapping mode of the LFNST transform set is determined, and for the larger-sized picture block, the DIMD is not used to derive the mapping mode, which can reduce the computational complexity and improve the encoding efficiency.

Figure 7:
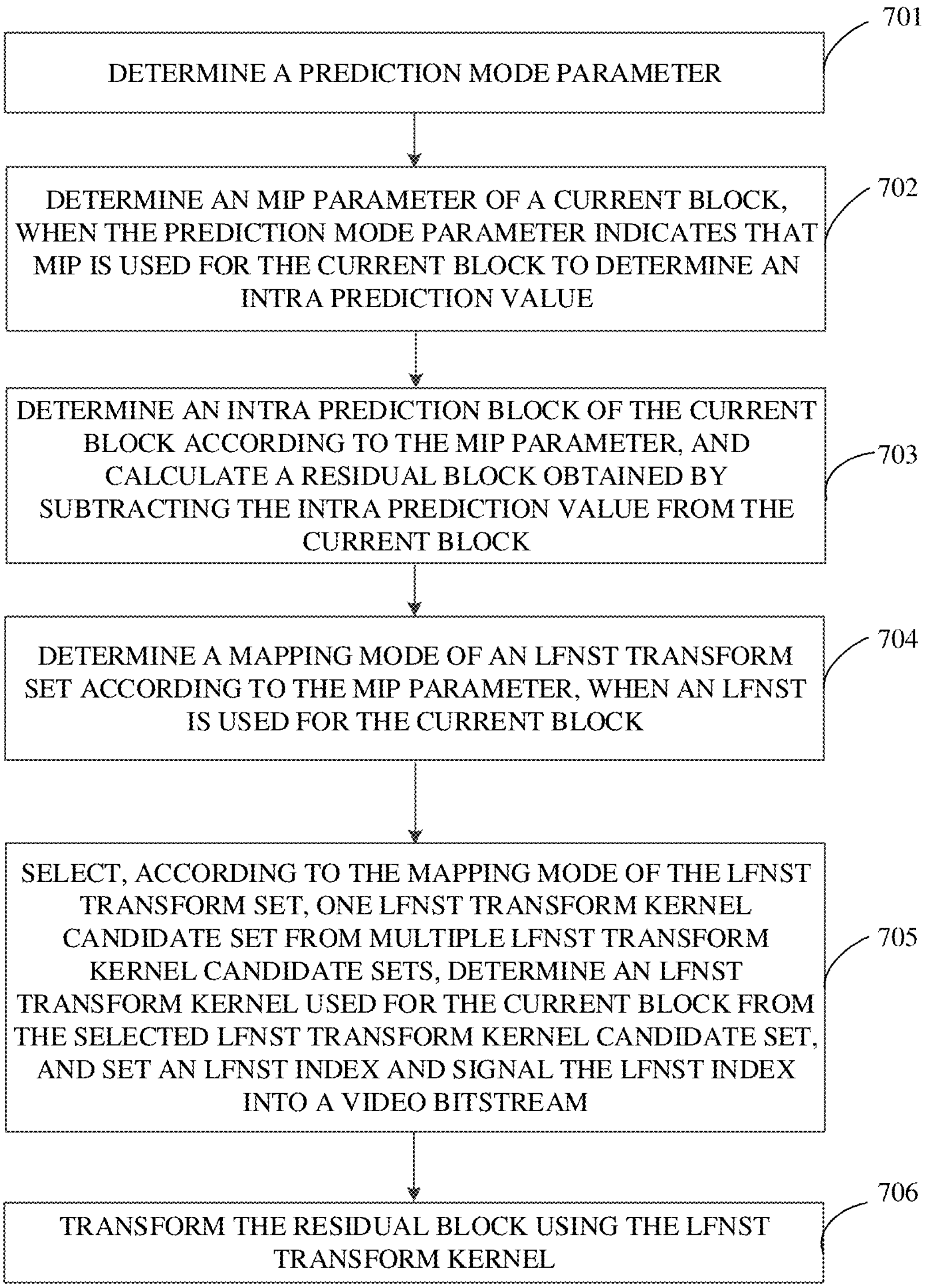
FIG. 7 is a schematic flow chart of an encoding method provided in embodiments of the disclosure.

Based on the above embodiments, embodiments of the disclosure provide an encoding method. FIG. 7 is a schematic flow chart of an encoding method provided in embodiments of the disclosure. As illustrated in FIG. 7, the encoding method performed by an encoder includes the following.

At block 701, a prediction mode parameter is determined.

In embodiments of the disclosure, the encoder can first determine the prediction mode parameter.

It should be noted that, in the embodiments of the disclosure, a picture of a video can be partitioned into multiple picture blocks, and each picture block currently to be encoded can be called a coding block (CB). Herein, each coding block can include a first colour component, a second colour component, and a third colour component. The current block is a coding block in the picture of the video for which prediction of the first colour component, the second colour component, or the third colour component is currently to be performed.

Assuming that prediction of the first colour component is performed for the current block, and the first colour component is a luma component, that is, the colour component to be predicted is a luma component, the current block can also be called a luma block. Alternatively, assuming that prediction of the second colour component is performed for the current block, and the second colour component is a chroma component, that is, the colour component to be predicted is a chroma component, the current block can also be called a chroma block.

It should be noted that, the prediction mode parameter indicates the coding mode of the current block and parameters related to this mode. Generally, rate-distortion optimization (RDO) can be used to determine the prediction mode parameter of the current block.

For example, in embodiments of the disclosure, in determining the prediction mode parameter of the current block, the colour component to be predicted of the current block is first determined. Then, based on the parameter of the current block, predictive coding is performed on the colour component to be predicted respectively by using multiple prediction modes, and the rate-distortion cost result corresponding to each of the multiple prediction modes is calculated. Finally, the smallest rate-distortion cost result is selected from the calculated multiple rate-distortion cost results, and the prediction mode corresponding to the smallest rate-distortion cost result is determined as the prediction mode parameter of the current block.

That is, in embodiments of the disclosure, at the encoding side, for the current block, multiple prediction modes can be used to encode the colour component to be predicted, respectively. Herein, multiple prediction modes typically include a traditional intra prediction mode and a non-traditional intra prediction mode, where the traditional intra prediction mode can include a DC mode, a PLANAR mode, an angular mode, etc., and the non-traditional intra prediction mode can include an MIP mode and a CCLM mode, an IBC mode, a PLT mode, etc.

In this way, after the current block is encoded with multiple prediction modes respectively, the rate-distortion cost result corresponding to each prediction mode can be obtained. Then, the smallest rate-distortion cost result is selected from the obtained multiple rate-distortion cost results, and the prediction mode corresponding to the smallest rate-distortion cost result is determines as the prediction mode parameter of the current block. As such, finally, the determined prediction mode can be used to encode the current block. In this prediction mode, the residual can be small, and the encoding efficiency can be improved.

It can be understood that, in embodiments of the disclosure, at the encoding side, predictive coding can be performed for the current block, and during predictive coding, the prediction mode of the current block can be determined and the corresponding prediction mode parameter can be signalled into the bitstream. As such, the prediction mode parameter can be transmitted from the encoder to the decoder.

Accordingly, at the encoding side, the bitstream is decoded to obtain the intra prediction mode of the luma or chroma component of the current block or the coding block containing the current block. In this case, the value of predModeIntra (intra prediction mode indicator) can be determined.

Further, in embodiments of the disclosure, by obtaining the prediction mode parameter, it is possible to determine based on the prediction mode parameter whether the MIP is used to determine the intra prediction value during intra prediction.

At block 702, an MIP parameter of a current block is determined, when the prediction mode parameter indicates that MIP is used for the current block to determine an intra prediction value.

In embodiments of the disclosure, after the prediction mode parameter is determined, if the prediction mode parameter indicates that the MIP is used to determine the intra prediction value, the MIP parameter of the current block can be further determined.

Note that, in embodiments of the disclosure, the MIP parameter can include parameters such as an MIP transpose indication parameter (which can be represented by isTransposed), an MIP mode index (which can be represented by modeId), a size of the current block, a type of the current block (which can be represented by mipSizeId), and the like.

That is, in embodiments of the disclosure, the determined MIP parameter can indicate at least one information such as the MIP transpose indication parameter, the MIP mode index, the size of the current block, and the type of the current block.

Further, in embodiments of the disclosure, the MIP parameter can include the MIP transpose indication parameter (which can be represented by isTransposed). Herein, a value of the MIP transpose indication parameter indicates whether to transpose a sample input vector used in the MIP mode.

Specifically, in the MIP mode, a neighbouring reference sample set can be obtained according to reference sample values corresponding to left neighbouring reference samples of the current block and reference sample values corresponding to top neighbouring reference samples of the current block. In this way, after the neighbouring reference sample set is obtained, an input reference sample set, that is, the sample input vector used in the MIP mode, can be constructed. However, the construction of the input reference sample set is different at the encoding side and the decoding side, which is mainly related to the value of the MIP transpose indication parameter.

When applied to the encoding side, the value of the MIP transpose indication parameter can be determined using the rate-distortion optimization method, which specifically includes the following.

A first cost value when transpose is performed is calculated and a second cost value when transpose is not performed is calculated.

If the first cost value is less than the second cost value, the value of the MIP transpose indication parameter can be determined to be 1.

If the first cost value is not less than the second cost value, the value of the MIP transpose indication parameter can be determined to be 0.

Further, when the value of the MIP transpose indication parameter is 0, in the buffer area, in the neighbouring reference sample set, the top reference sample values can be stored before the left reference sample values. In this case, there is no need to transpose, that is, there is no need to transpose the sample input vector used in the MIP mode, and the buffer area can be directly determined as the input reference sample set. When the value of the MIP transpose indication parameter is 1, in the buffer area, in the neighbouring reference sample set, the top reference sample values can be stored after the left reference sample values. In this case, the buffer area is transposed, that is, the sample input vector used in the MIP mode needs to be transposed, and the transposed buffer area is determined as the input reference sample set. In this way, the input reference sample set is obtained, which can be used in the process of determining the intra prediction value corresponding to the current block in the MIP mode.

It is noted that, at the encoding side, after the value of the MIP transpose indication parameter is determined, the determined value of the MIP transpose indication parameter needs to be signalled into the bitstream, to facilitate subsequent decoding at the decoding side.

Further, in embodiments of the disclosure, the MIP parameter can further include an MIP mode index (which can be represented by a modeId), where the MIP mode index indicates the MIP mode used for the current block, and the MIP mode indicates a calculation and derivation method of determining the intra prediction block of the current block with the MIP. That is, for the MIP mode, since there are many kinds of MIP modes, these kinds of MIP modes can be distinguished by MIP mode indexs, that is, different MIP modes have different MIP mode indexs. In this way, according to the calculation and derivation method of determining the intra prediction block of the current block with the MIP, a specific MIP mode can be determined, and the corresponding MIP mode index can be obtained. In embodiments of the disclosure, the value of the MIP mode index can be 0, 1, 2, 3, 4, or 5.

Further, in embodiments of the disclosure, the MIP parameter can further include parameters such as the size of the current block, the aspect ratio of the current block, and the like. According to the size of the current block (that is, the width and height of the current block), the type of the current block (which can be represented by mipSizeId) can also be determined.

For example, if the width and height of the current block are both equal to 4, the value of mipSizeId can be set to 0. On the contrary, if one of the width and height of the current block is equal to 4 or the width and height of the current block are both equal to 8, the value of mipSizeId can be set to 1. Otherwise, if the current block is a block of another size, the value of mipSizeId can be set to 2.

For example, if the width and height of the current block are both equal to 4, the value of mipSizeId can be set to 0. On the contrary, if one of the width and height of the current block is equal to 4, the value of mipSizeId can be set to 1. Otherwise, if the current block is a block of another size, the value of mipSizeId can be set to 2.

In this way, in the process of determining the intra prediction value using the MIP, the MIP parameter can also be determined, which facilitates determining the LFNST transform kernel (which can be represented by kernel) used for the current block according to the determined MIP parameter.

That is, in embodiments of the disclosure, the MIP parameter can be used to determine the size parameter of the current block, where the size parameter can represent the size of the current block, which can be the height and width of the current block or the aspect ratio of the current block.

At block 703, an intra prediction block of the current block is determined according to the MIP parameter, and a residual block obtained by subtracting the intra prediction value from the current block is calculated.

In embodiments of the disclosure, if the prediction mode parameter indicates that the intra prediction value is determined using the MIP, after the MIP parameter of the current block is determined, the intra prediction block of the current block can be further determined according to the MIP parameter, and the residual block obtained by subtracting the intra prediction value from the current block can be calculated.

In embodiments of the disclosure, for the MIP mode, the input data of MIP prediction includes: a position (xTbCmp, yTbCmp) of the current block, an MIP prediction mode (which can be represented by modeId) applied to the current block, a height (which can be represented by nTbH) of the current block, a width (which can be represented by nTbW) of the current block, a transpose indication flag indicating whether to transpose (which can be represented by isTransposed), etc. The output data of the MIP prediction includes: a prediction block of the current block, and the intra prediction value predSamples [x][y] corresponding to sample coordinates [x][y] in the prediction block, where $x=0, 1, \ldots, nTbW-1$ and $y=0, 1, \ldots, nTbH-1$.

It can be understood that in embodiments of the disclosure, the MIP prediction process can include four steps: core parameter configuration, reference sample acquisition, input sample construction, and prediction value generation. For core parameter configuration, according to the size of the current block in the picture, the current block can be classified into three types, where the type of the current block can be recorded by mipSizeId. Moreover, different types of current blocks are different in terms of the number of reference samples and the number of matrix multiplication output samples. For reference sample acquisition, in predicting the current block, the top block and the left block of the current block are encoded blocks, the reference samples in the MIP technology are the reconstructed values of the top row samples and the left column samples of the current block, and the process of acquiring the top neighbouring reference samples (refT) and the left neighbouring reference samples (refL) of the current block is the process of acquiring the reference samples. For input sample construction, the step is used for the input of matrix multiplication, and can mainly include: reference sample acquisition, reference sample buffer area construction, and matrix multiplication input sample derivation. The reference sample acquisition is a downsampling process, and reference sample buffer area construction can include a padding method of the buffer area when transpose is not required and a padding method of the buffer area when transpose is required. For prediction value generation, the step is used for obtaining the MIP prediction value of the current block, and can mainly include: matrix multiplication output sample block construction, matrix multiplication output sample embedding, matrix multiplication output sample transposition, and final MIP prediction value generation. The matrix multiplication output sample block construction can further include: obtaining a weight matrix, obtaining a shift factor and an offset factor, and matrix multiplication operation, and the final MIP prediction value generation can further include: generating a prediction value that does not require upsampling and generating a prediction value that requires upsampling. As such, after the four steps, the intra prediction block of the current block can be obtained.

It can be understood that, in embodiments of the disclosure, after the intra prediction block of the current block is determined, a difference value can be obtained by subtracting the intra prediction value from the actual sample value of the current block, and the calculated difference value can be used as the residual block, to facilitate subsequent transformation on the residual block.

At block 704, a mapping mode of an LFNST transform set is determined according to the MIP parameter, when an LFNST is used for the current block.

In embodiments of the disclosure, based on a determination that the LFNST is used for the current block, the mapping mode of the LFNST transform set can be further determined according to the MIP parameter.

It is noted that, in embodiments of the disclosure, the LFNST is not performed on any current block. In one possible embodiment, the LFNST can be performed on the current block only when the current block satisfies all the following conditions. The conditions include: (a) both the width and height of the current block being greater than or equal to 4; (b) both the width and height of the current block being less than or equal to the maximum size of the transform unit; (c) the prediction mode of the current block or the coding block containing the current block being the intra prediction mode; (d) the primary transform of the current block being the two-dimensional forward primary transform (e.g., two-dimensional discrete cosine transform, DCT2) in both the horizontal and vertical directions; (e) the intra prediction mode of the current block or the coding block containing the current block being the non-MIP mode, or the prediction mode of the transform unit being the MIP mode and both the width and height of the transform unit being greater than or equal to 16.

Further, based on a determination that the LFNST can be performed the current block, the LFNST transform kernel (which can be represented by kernel) used for the current block is further needed to be determined.

It is noted that, in embodiments of the disclosure, the MIP parameter can be a size parameter of the current block, and the size parameter can represent the size of the current block, which can be the height and width of the current block or the aspect ratio of the current block.

That is, in embodiments of the disclosure, in determining the mapping mode of the LFNST transform set, reference can be made to the size parameter of the current block. For example, the mapping mode of the LFNST transform set is determined based on the height and width of the current block, or the mapping mode of the LFNST transform set is determined based on the aspect ratio of the current block.

Further, in embodiments of the disclosure, in determining the mapping mode of the LFNST transform set according to the size parameter of the current block, first, whether the size parameter satisfies a first preset condition can be determined. If the size parameter satisfies the first preset condition, the first preset prediction mode can be determined as the mapping mode of the LFNST transform set. If the size parameter does not satisfy the first preset condition, the mapping mode of the LFNST transform set is determined using the DIMD.

It is noted that, in embodiments of the disclosure, the first preset condition can be used to limit the size of the current block. The first preset condition corresponds to the size parameter of the current block. If the size parameter of the current block is the height and the width of the current block, the first preset condition can limit the height and the width respectively. If the size parameter of the current block is the aspect ratio of the current block, the first preset condition can limit the aspect ratio.

For example, in embodiments of the disclosure, assuming that the size parameter of the current block is the height and width of the current block, the first preset condition can be set to: the width being greater than or equal to a preset width threshold and/or the height being greater than or equal to a preset height threshold. For example, if the height of the current block is greater than or equal to the preset height threshold or the width of the current block is greater than or equal to the preset width threshold, it can be determined that the size parameter satisfies the first preset condition. If the height of the current block is less than the preset height threshold and the width of the current block is less than the preset width threshold, it can be determined that the size parameter does not satisfy the first preset condition.

It can be understood that in embodiments of the disclosure, the preset width threshold value and the preset height threshold value can be any value greater than or equal to 0. For example, the preset width threshold value is 32 and the preset height threshold value is also 32, that is, if the height or width of the current block is greater than or equal to 32, it can be determined that the current block satisfies the first preset condition. For example, the preset width threshold value is 32 and the preset height threshold value is 16, that is, if the height of the current block is greater than or equal to 32 or the width of the current block is greater than or equal to 16, it can be determined that the current block satisfies the first preset condition.

It can be understood that in embodiments of the disclosure, the use of the DIMD can be constrained by the first preset condition, that is, only when the size parameter of the current block does not satisfy the first preset condition, the use of the DIMD is allowed to determine the mapping mode of the LFNST transform set.

It can be seen that, in the encoding method provided in embodiments of the disclosure, in determining the mapping mode of the LFNST transform set, the size of the picture block using the DIMD can be constrained with the first preset condition, in other words, the DIMD can be used only for some picture blocks, thereby effectively reducing the computational complexity. For example, only for picture blocks of smaller size, the use of the DIMD is allowed to determine the mapping mode of the LFNST transform set.

Further, in embodiments of the disclosure, if the size parameter of the current block satisfies the first preset condition, the first preset prediction mode can be directly determined as the mapping mode of the LFNST transform set. The first preset prediction mode can be a PLANAR mode or a DC mode.

That is, in embodiments of the disclosure, in determining the mapping mode of the LFNST transform set, in combination with the first preset condition, it is possible to directly set the mapping modes for some picture blocks. For example, the PLANAR mode or the DC mode is directly determined as the mapping mode of the LFNST transform set for a picture block having a larger size.

Further, in embodiments of the disclosure, in determining the mapping mode of the LFNST transform set using the DIMD, at least one intra prediction mode can be traversed first, to determine at least one gradient information corresponding to the current block, and the mapping mode of the LFNST transform set can be determined according to the at least one gradient information. One intra prediction mode corresponds to one gradient information, and the gradient information can be a gradient histogram.

It can be understood that, in embodiments of the disclosure, in determining the mapping mode of the LFNST transform set according to the at least one gradient information, a gradient amplitude value corresponding to each intra prediction mode can be determined based on the at least one gradient information. An intra prediction mode with a largest gradient amplitude value among the at least one intra prediction mode can then be determined as the mapping mode of the LFNST transform set. One intra prediction mode corresponds to one gradient amplitude value.

That is, in embodiments of the disclosure, based on the DIMD technology, it is possible to derive the intra prediction mode at the decoding side by using the same method as the encoding side to save bit overhead. It mainly includes two steps. At the first step, a prediction mode is derived, where the same prediction mode intensity calculation method is used at both the encoding side and the decoding side. For example, the Sobel operator is used to calculate the histogram of gradients for each prediction mode. The action region is a L-shaped region consist of the top three rows of neighbouring reconstructed samples, the left three columns of neighbouring reconstructed samples, and the corresponding top-left neighbouring reconstructed samples of the current block. By calculating the histogram of gradients within this L-shaped region, the first prediction mode corresponding to the maximum amplitude and the second prediction mode corresponding to the second-maximum amplitude in the histogram can be obtained. At the second step, a prediction block is derived, where the same prediction block derivation mode is used at both the encoding side and the decoding side to obtain the current prediction block. For example, the following two conditions are evaluated: 1) the gradient of the second prediction mode is not 0; and 2) neither the first prediction mode nor the second prediction mode is the PLANAR or DC prediction mode. If both conditions are not simultaneously satisfied, for the current prediction block, only the first prediction mode is used to calculate the prediction sample values of the current block. That is, the regular prediction process is applied to the first prediction mode. Otherwise, if both conditions are satisfied, the current prediction block will be derived using a weighted averaging approach. Specifically, a weight for the PLANAR mode is ⅓. A weight for the first prediction mode is calculated as ⅔ multiplied by the ratio of the gradient intensity of the first prediction mode to the sum of the gradient intensities of the first and second prediction modes. A weight for the second prediction mode is calculated as ⅔ multiplied by the ratio of the gradient intensity of the second prediction mode to the sum of the gradient intensities of the first and second prediction modes. The weighted averaging is performed on above three prediction modes, i.e., PLANAR, the first prediction mode, and the second prediction mode, to obtain the prediction block of the current coding unit. The decoding side obtains the prediction block in the same steps.

Further, in embodiments of the disclosure, first, a downsampling vector of the current block can be determined according to the MIP parameter. Then, matrix multiplication calculation is performed according to the downsampling vector, to obtain an MIP output vector. An MIP prediction block of the current block is determined according to the MIP output vector. Finally, for the MIP prediction block, the at least one intra prediction mode is traversed to obtain at least one gradient information.

It can be understood that in embodiments of the disclosure, Haar-downsampling can be performed on the acquired neighbouring reference reconstructed samples according to the size parameter of the current block, and the sampling step size is determined by the size parameter of the current block. The concatenation order of downsampled top reference reconstructed samples and downsampled left reference reconstructed samples is adjusted according to the MIP transpose indication parameter. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained with the traversed prediction mode as an index, and are calculated with the input (downsampling vector), to obtain the output vector (MIP output vector). Then, according to the number of samples of the output vector and the size parameter of the current block, whether to upsample the output vector is determined. If upsampling is not needed, the vector is arranged in sequence in a horizontal direction to output as the MIP prediction block of the current block. If upsampling is needed, the vector is upsampled in the horizontal direction and then is upsampled in a vertical direction, to upsample to the same size as that of the current block, to output as the MIP prediction block of the current block.

Then, if the DIMD is determined to be used for the current block, the DIMD method is directly used for the MIP prediction block of the current block to derive the optimal traditional intra prediction mode as the mapping mode of the LFNST transform set. That is, the at least one intra prediction mode is traversed for the MIP prediction block of the current block, to calculate the gradient information of the at least one intra prediction mode for the MIP prediction block of the current block.

That is, in embodiments of the disclosure, the DIMD calculation process can be performed after upsampling of the MIP output vector.

Further, in embodiments of the disclosure, first, a downsampling vector of the current block can be determined according to the MIP parameter. Then, matrix multiplication calculation is performed according to the downsampling vector to obtain an MIP output vector. Finally, for the MIP output vector, the at least one intra prediction mode is traversed to obtain the at least one gradient information.

It can be understood that in embodiments of the disclosure, Haar-downsampling can be performed on the acquired neighbouring reference reconstructed samples according to the size parameter of the current block, and the sampling step size is determined by the size parameter of the current block. The concatenation order of downsampled top reference reconstructed samples and downsampled left reference reconstructed samples is adjusted according to the MIP transpose indication parameter. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Then, the MIP matrix coefficients can be obtained with the traversed prediction mode as an index, and are calculated with the input (downsampling vector), to obtain the output vector (MIP output vector).

Then, if the DIMD is determined to be used for the current block, the DIMD method is directly used for the MIP output vector of the current block to derive the optimal traditional intra prediction mode as the mapping mode of the LFNST transform set. That is, the at least one intra prediction mode is traversed for the MIP output vector, to calculate the gradient information of the at least one intra prediction mode for the MIP prediction block of the current block. Then, according to the number of samples of the output vector (MIP output vector) and the size parameter of the current block, whether to upsample the output vector is determined. If upsampling is not needed, the vector is arranged in sequence in a horizontal direction to output as the MIP prediction block of the current block. If upsampling is needed, the vector is upsampled in the horizontal direction and then is upsampled in a vertical direction, to upsample to the same size as that of the current block, to output as the MIP prediction block of the current block.

That is, in embodiments of the disclosure, the DIMD calculation process can be performed before upsampling of the MIP output vector.

It is noted that, in embodiments of the disclosure, in determining the mapping mode of the LFNST transform set by using the DIMD, all 67 intra prediction modes can be traversed to obtain 67 corresponding gradient information. Alternatively, some intra prediction modes among all 67 intra prediction modes can be traversed to obtain corresponding gradient information.

That is, in embodiments of the disclosure, to further reduce the complexity of the encoding and decoding sides, for the use of the DIMD, 67 intra prediction modes can be selectively skipped, to reduce the number of traversed intra prediction modes. For example, selection can be performed with a step size of 1.

At block 705, according to the mapping mode of the LFNST transform set, one LFNST transform kernel candidate set is selected from multiple LFNST transform kernel candidate sets, an LFNST transform kernel used for the current block is determined from the selected LFNST transform kernel candidate set, and an LFNST index is set and the LFNST index is signaled into a video bitstream.

In embodiments of the disclosure, if the LFNST is used for the current block, after the mapping mode of the LFNST transform set is determined according to the MIP parameter, one LFNST transform kernel candidate set can be selected from the multiple LFNST transform kernel candidate sets according to the mapping mode of the LFNST transform set, and then the LFNST transform kernel used for the current block can be determined from the selected LFNST transform kernel candidate set, and the LFNST index can be set and signalled into the video stream.

Further, in embodiments of the disclosure, in determining the LFNST transform kernel used for the current block, an index of the mapping mode of the LFNST transform set can be determined first. Then, according to a value of the index, a value of an LFNST intra prediction mode index can be determined. One LFNST transform kernel candidate set can be selected from the multiple LFNST transform kernel candidate sets according to the value of the LFNST intra prediction mode index. Finally, the LFNST transform kernel used for the current block can be selected from the selected LFNST transform kernel candidate set. The LFNST index can be set and signalled into the video stream.

That is, in embodiments of the disclosure, after the mapping mode of the LFNST transform set is determined, the index of the mapping mode of the LFNST transform set can be further determined, and then the value of the index of the mapping mode of the LFNST transform set can be converted into the value of the LFNST intra prediction mode index (which can be represented by predModeIntra). Then, according to the value of predModeIntra, one LFNST transform kernel candidate set is selected from the multiple LFNST transform kernel candidate sets to determine the transform kernel candidate set. From the selected LFNST transform kernel candidate set, the LFNST transform kernel used for the current block is selected.

Note that, in embodiments of the disclosure, in determining the LFNST transform kernel candidate set and the corresponding LFNST transform kernel, the multiple LFNST transform kernel candidate sets can include four LFNST transform kernel candidate sets, where each LFNST transform kernel candidate set includes two LFNST transform kernels. Accordingly, the value of the LFNST intra prediction mode index corresponding to the value of the index can be determined using a first look-up table.

It can be understood that in embodiments of the disclosure, the DC mode, the PLANAR mode, or the angular prediction mode and the transform sets of the LFNST can be bound based on the first look-up table, such as the first look-up table illustrated in Table 1.

Note that, in embodiments of the disclosure, in determining the LFNST transform kernel candidate set and the corresponding LFNST transform kernel, the multiple LFNST transform kernel candidate sets can include 35 LFNST transform kernel candidate sets, where each LFNST transform kernel candidate set includes 3 LFNST transform kernels. Accordingly, the value of the LFNST intra prediction mode index corresponding to the value of the index can be determined using a second look-up table.

It can be understood that in embodiments of the disclosure, based on the second look-up table, the LFNST transform sets corresponding to different intra prediction modes can be finer, for example, the second look-up table illustrated in FIG. 2.

It is noted that, in embodiments of the disclosure, the LFNST transform kernel can be understood as a transform matrix of the LFNST, which is a matrix with multiple fixed coefficients obtained by training.

Furthermore, in the embodiments of the disclosure, since the LFNST transform kernel candidate set contains two or more preset transform kernels for the MIP, the transform kernel used for the current block can be selected in the rate-distortion optimization method. Specifically, for each transform kernel, the rate-distortion cost (RDCost) can be calculated in the rate-distortion optimization method, and then the transform kernel with the smallest RDCost is selected as the transform kernel used for the current block.

That is, at the encoding side, one group of LFNST transform kernels can be selected through RDCost, and the index (which can be represented by lfnst_idx) corresponding to the LFNST transform kernel is signalled into the video bitstream and transmitted to the decoding side. When the first group of LFNST transform kernels (i.e., the first group of transform matrices) in the LFNST transform kernel candidate set is selected, lfnst_idx is set to be 1. When the second group of LFNST transform kernels (i.e., the second group of transform matrices) in the LFNST transform kernel candidate set is selected, lfnst_idx is set to be 2.

Note that, in embodiments of the disclosure, the value of the LFNST index can indicate whether the LFNST is used for the current block, and can also indicate the index of the LFNST transform kernel in the LFNST transform kernel candidate set.

It is to be noted that, in the embodiments of the disclosure, for the value of the LFNST index (i.e., lfnst_idx), when the value of the LFNST index is equal to 0, the LFNST will not be used; when the value of the LFNST index is greater than 0, the LFNST will be used. The index of the transform kernel is equal to the value of the LFNST index or equal to the value of the LFNST index minus 1. Thereby, the LFNST transform kernel used for the current block can be determined according to the LFNST index.

Further, in embodiments of the disclosure, the MIP parameter can further include an MIP transpose indication parameter, where a value of the MIP transpose indication parameter indicates whether to transpose a sample input vector used in the MIP mode. Accordingly, when the value of the MIP transpose indication parameter indicates to transpose the sample input vector used in the MIP mode, the matrix-transpose can be performed on the selected transform kernel to obtain the LFNST transform kernel used for the current block.

It can be understood that, in embodiments of the disclosure, when the value of the MIP transpose indication parameter is equal to 1, it can be considered that the value of the MIP transpose indication parameter indicates to transpose the sample input vector used in the MIP mode. In this case, the corresponding matrix-transpose is performed on the selected transform kernel, so that the LFNST transform kernel used for the current block can be obtained.

At block 706, the residual block is transformed using the LFNST transform kernel.

In embodiments of the disclosure, after one LFNST transform kernel candidate set is selected from the multiple LFNST transform kernel candidate sets according to the mapping mode of the LFNST transform set and the LFNST transform kernel used for the current block is determined from the selected LFNST transform kernel candidate set, the LFNST transform kernel, that is, the transform matrix selected for the current block, can be used to transform the residual block.

For example, in a possible embodiment, at the encoding side, the encoder traverses the prediction modes, and if the current coding unit (current block) is in the intra mode, the encoder obtains an enable flag, that is, an MIP enable flag (prediction mode parameter), in the encoding and decoding method provided in embodiments of the disclosure, where the flag can be a sequence-level flag and indicates whether the MIP technology is currently enabled for the encoder. The sequence-level flag can be expressed in the form of sps_mip_enable_flag.

Then, if the MIP enable flag is true, the encoder tries the prediction method of the MIP, and calculates the corresponding rate-distortion cost as cost1. If the MIP enable flag is false, the encoder does not try the prediction method of the MIP, but continues to traverse other intra prediction technologies and calculates the corresponding rate-distortion costs as cost2, . . . , costN.

If the MIP enable flag is true, Haar-downsampling can be performed on the acquired neighbouring reference reconstructed samples according to the size of the current coding unit (the size parameter of the current block), and the sampling step size is determined according to the size of the coding unit. In combination with the MIP transpose indication parameter, the concatenation order of downsampled top reference reconstructed samples and downsampled left reference reconstructed samples is adjusted. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Next, the MIP matrix coefficients are obtained with the traversed prediction mode as an index, and are calculated with the input (downsampling vector), to obtain the output vector (MIP output vector). Then, according to the number of samples of the output vector and the size parameter of the current coding unit, whether to upsample the output vector is determined. If upsampling is not needed, the vector is arranged in sequence in a horizontal direction to output as the prediction block of the current coding unit (the MIP prediction block of the current block). If upsampling is needed, the vector is upsampled in the horizontal direction and then is upsampled in a vertical direction, to upsample to the same size as that of the current coding unit, to output as the prediction block of the current coding unit (the MIP prediction block of the current block).

Note that, if the size parameter of the current block satisfies the first preset condition, the first preset prediction mode is directly determined as the mapping mode of the LFNST transform set. For example, if the width and height of the current coding unit are both greater than or equal to 32, the PLANAR mode (first preset prediction mode) can be used as the mapping mode of the LFNST transform set. If the size parameter of the current block satisfies the first preset condition, the DIMD method is used for the current MIP prediction block to derive the optimal traditional intra prediction mode as the mapping mode of the LFNST transform set.

Further, when the DIMD method is used to derive the traditional intra prediction mode as the mapping mode of the LFNST transform set, for the current MIP prediction block, 67 intra prediction modes (or part of the intra prediction modes) in the current VVC and ECM are traversed, to calculate the gradient information of each intra prediction mode for the current MIP prediction block. Then, the corresponding gradient amplitude value is determined based on the gradient information. The traversed intra prediction mode is sorted according to the gradient amplitude value, and the intra prediction mode with the maximum amplitude is the optimal mode, and the optimal mode is used to map the LFNST transform set of the current coding unit.

After the mapping mode of the LFNST transform set is determined, the residual block of the current coding unit (the current block) is obtained by subtracting the prediction block (the MIP prediction block of the current block) from the original picture block of the current coding unit, the primary transform is performed on the residual block to obtain the frequency domain coefficient block, and the secondary transform is performed on the region of interest of the frequency domain coefficient block using the LFNST, where the mapping prediction mode of the transform set of the LFNST has been determined with the above method. Thereafter, through the processes of quantization, inverse quantization and inverse transformation, the rate-distortion cost of the current coding unit is calculated, which is recorded as cost1.

Further, it is possible to further traverse other intra prediction technologies and calculate the corresponding rate-distortion costs as cost2, . . . , costN. If cost1 is the smallest among all rate-distortion costs, the MIP technology is enabled for the current coding unit, and the MIP usage flag and the corresponding MIP transpose flag (MIP transpose indication parameter) of the current coding unit are set to true and signalled into the bitstream. If cost1 is not the smallest among all rate-distortion costs, another intra prediction technology is enabled for the current coding unit, and the MIP usage flag of the current coding unit is set to false and signalled into the bitstream. Information such as the flag or index of another intra prediction technology is transmitted according to definition.

For example, in another possible embodiment, the encoder traverses the prediction modes, and if the current coding unit (current block) is in the intra mode, the encoder obtains an enable flag, that is, an MIP enable flag (prediction mode parameter), in the encoding and decoding method provided in embodiments of the disclosure, where the flag can be a sequence-level flag and indicates whether the MIP technology is currently enabled for the encoder. The sequence-level flag can be expressed in the form of sps_mip_enable_flag.

Then, if the MIP enable flag is true, the encoder tries the prediction method of the MIP, and calculates the corresponding rate-distortion cost as cost1. If the MIP enable flag is false, the encoder does not try the prediction method of the MIP, but continues to traverse other intra prediction technologies and calculates the corresponding rate-distortion costs as cost2, . . . , costN.

If the MIP enable flag is true, Haar-downsampling can be performed on the acquired neighbouring reference reconstructed samples according to the size of the current coding unit (the size parameter of the current block), and the sampling step size is determined according to the size of the coding unit. In combination with the MIP transpose indication parameter, the concatenation order of downsampled top reference reconstructed samples and downsampled left reference reconstructed samples is adjusted. If transpose is not required, the downsampled left reference reconstructed samples are concatenated to the end of the downsampled top reference reconstructed samples, and the obtained vector is taken as the input (downsampling vector). If transpose is required, the downsampled top reference reconstructed samples are concatenated to the end of the downsampled left reference reconstructed samples, and the obtained vector is taken as the input (downsampling vector).

Next, the MIP matrix coefficients are obtained with the traversed prediction mode as an index, and are calculated with the input (downsampling vector), to obtain the output vector (MIP output vector).

Note that, if the size parameter of the current block satisfies the first preset condition, the first preset prediction mode is directly determined as the mapping mode of the LFNST transform set. For example, if the width and height of the current coding unit are both greater than or equal to 32, the PLANAR mode (first preset prediction mode) can be used as the mapping mode of the LFNST transform set. If the size parameter of the current block satisfies the first preset condition, the DIMD method is used for the current MIP output vector to derive the optimal traditional intra prediction mode as the mapping mode of the LFNST transform set.

Further, when the DIMD method is used to derive the traditional intra prediction mode as the mapping mode of the LFNST transform set, for the current MIP output vector (MIP output vector), 67 intra prediction modes (or part of the intra prediction modes) in the current VVC and ECM are traversed, to calculate the gradient information of each intra prediction mode for the current MIP output vector. Then, the corresponding gradient amplitude value is determined based on the gradient information. The traversed intra prediction mode is sorted according to the gradient amplitude value, and the intra prediction mode with the maximum amplitude is the optimal mode, and the optimal mode is used to map the LFNST transform set of the current coding unit.

Further, according to the number of samples of the output vector and the size parameter of the current coding unit, whether to upsample the output vector is determined. If upsampling is not needed, the vector is arranged in sequence in a horizontal direction to output as the prediction block of the current coding unit (the MIP prediction block of the current block). If upsampling is needed, the vector is upsampled in the horizontal direction and then is upsampled in a vertical direction, to upsample to the same size as that of the current coding unit, to output as the prediction block of the current coding unit (the MIP prediction block of the current block).

After the mapping mode of the LFNST transform set is determined, the residual block of the current coding unit (the current block) is obtained by subtracting the prediction block (the MIP prediction block of the current block) from the original picture block of the current coding unit, the primary transform is performed on the residual block to obtain the frequency domain coefficient block, and the secondary transform is performed on the region of interest of the frequency domain coefficient block using the LFNST, where the mapping prediction mode of the transform set of the LFNST has been determined with the above method. Thereafter, through the processes of quantization, inverse quantization and inverse transformation, the rate-distortion cost of the current coding unit is calculated, which is recorded as cost1.

Further, it is possible to further traverse other intra prediction technologies and calculate the corresponding rate-distortion costs as cost2, . . . , costN. If cost1 is the smallest among all rate-distortion costs, the MIP technology is enabled for the current coding unit, and the MIP usage flag and the corresponding MIP transpose flag (MIP transpose indication parameter) of the current coding unit are set to true and signalled into the bitstream. If cost1 is not the smallest among all rate-distortion costs, another intra prediction technology is enabled for the current coding unit, and the MIP usage flag of the current coding unit is set to false and signalled into the bitstream. Information such as the flag or index of another intra prediction technology is transmitted according to definition.

According to the encoding method provided in embodiments of the disclosure, the complexity of software and hardware in the JVET-Z0048 solution is reduced while similar performance is maintained, for example, there is no change in performance of the luma component. Compared to ECM4.0, it maintains the same performance as JVET-Z0048.

Further, in embodiments of the disclosure, considering that the hardware decoder has different requirements for the I frame and the B frame, the encoding method provided in embodiments of the disclosure can be used only for the B frame, or can be used for both the I frame and the B frame. Alternatively, the encoding method provided in embodiments of the disclosure can be used only for the I frame. Alternatively, the conditions under which the encoding method provided in embodiments of the disclosure is allowed to be used are different for the B frame or the I frame. For example, for the I frame, coding units of all sizes are allowed to use the encoding method provided in embodiments of the disclosure, while for the B frame, only coding units of small size are allowed to use the encoding method provided in embodiments of the disclosure.

Further, in embodiments of the disclosure, if the MIP prediction mode is used for the luma component of the current coding unit (current block) and both the MIP prediction mode and the traditional intra prediction mode are not used for the chroma component, the LFNST transform set of the chroma component can inherit the LFNST transform set of the luma component.

Further, in embodiments of the disclosure, if the traditional intra prediction mode is not used for the current coding unit (current block), the LFNST transform sets of both the luma and chroma component can be solved according to the encoding method provided in embodiments of the disclosure.

In conclusion, the encoding method provided in embodiments of the disclosure relates to a method of deriving the MIP prediction block using the DIMD and mapping the LFNST transform set. On the one hand, the size of coding units using the DIMD is limited. For larger picture blocks, upsampling of the MIP output vector is more complex and the direction information is not obvious, so the process of deriving the traditional prediction mode using the DIMD is skipped to reduce the computational complexity. On the other hand, on the basis of limiting the size of coding units using the DIMD, the computational complexity is further reduced, for example, the MIP output vector before upsampling is used as the input of the DIMD to derive the optimal traditional intra prediction mode.

The decoding method is provided in embodiments of the disclosure. At the encoding side, the prediction mode parameter is determined. The MIP parameter of the current block is determined, when the prediction mode parameter indicates that the MIP is used for the current block to determine the intra prediction value. The intra prediction block of the current block is determined according to the MIP parameter, and the residual block obtained by subtracting the intra prediction value from the current block is calculated. The mapping mode of the LFNST transform set is determined according to the MIP parameter, when the LFNST is used for the current block. According to the mapping mode of the LFNST transform set, one LFNST transform kernel candidate set is selected from the multiple LFNST transform kernel candidate sets, the LFNST transform kernel used for the current block is determined from the selected LFNST transform kernel candidate set, and the LFNST index is set and the LFNST index is signaled into the video bitstream. The residual block is transformed using the LFNST transform kernel. Therefore, in embodiments of the disclosure, in deriving the prediction block, according to the size parameter in the MIP parameter of the current block, the mapping mode of the LFNST transform set is determined, and for the larger-sized picture block, the DIMD is not used to derive the mapping mode, which can reduce the computational complexity and improve the encoding efficiency.

Figure 8:
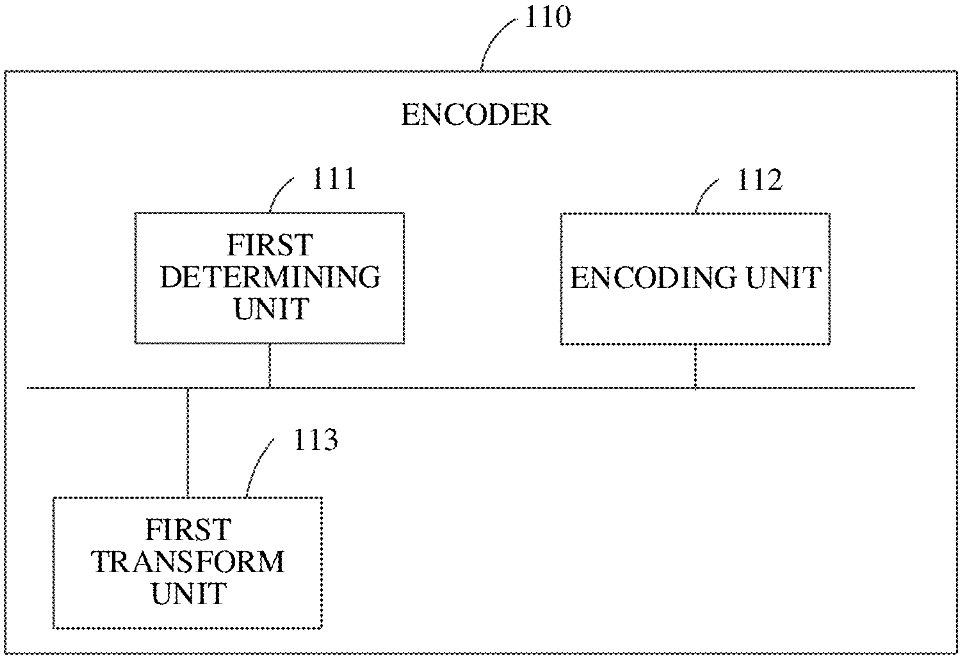
FIG. 8 is schematic structural diagram 1 of an encoder.

Based on the above embodiments, in another embodiment of the disclosure, and based on the same inventive concept as the above embodiments, FIG. 8 is schematic structural diagram 1 of an encoder. As illustrated in FIG. 8, the encoder 110 includes a first determining unit 111, an encoding unit 112, and a first transform unit 113.

The first determining unit 111 is configured to: determine a prediction mode parameter; determine an MIP parameter of a current block, when the prediction mode parameter indicates that MIP is used for the current block to determine an intra prediction value; determine an intra prediction block of the current block according to the MIP parameter, and calculate a residual block obtained by subtracting the intra prediction value from the current block; determine a mapping mode of an LFNST transform set according to the MIP parameter, when an LFNST is used for the current block; select, according to the mapping mode of the LFNST transform set, one LFNST transform kernel candidate set from multiple LFNST transform kernel candidate sets, determine an LFNST transform kernel used for the current block from the selected LFNST transform kernel candidate set, and set an LFNST index. The encoding unit 112 is configured to signal the LFNST index into a video bitstream. The first transform unit 113 is configured to transform the residual block using the LFNST transform kernel.

It can be understood that, in the embodiment, a "unit" can be a part of a circuit, a part of a processor, a part of a program, or software, etc., which can be a module or not. In addition, in the embodiment, the various components can be integrated into one processing unit, or each unit can be physically present, or two or more units can be integrated into one unit. The above-mentioned integrated unit can be implemented in the form of hardware or a software function unit.

The integrated unit can be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, can be embodied in the form of a software product which is stored in a memory and includes instructions for causing a computer device (which can be a personal computer, a server, a network device, or the like) or a processor to perform all or part of the steps described in the various embodiments of the present disclosure. The memory includes various medium capable of storing program codes, such as a universal serial bus (USB) flash disk, a read-only memory (ROM), a random access memory (RAM), a removable hard disk, disk, compact disc (CD), or the like.

Thus, embodiments of the disclosure provide a computer-readable storage medium. The computer-readable storage medium is applied to the encoder 110 and stores computer programs. When executed by a first processor, the computer programs are configured to implement the method of any of the above embodiments.

Figure 9:
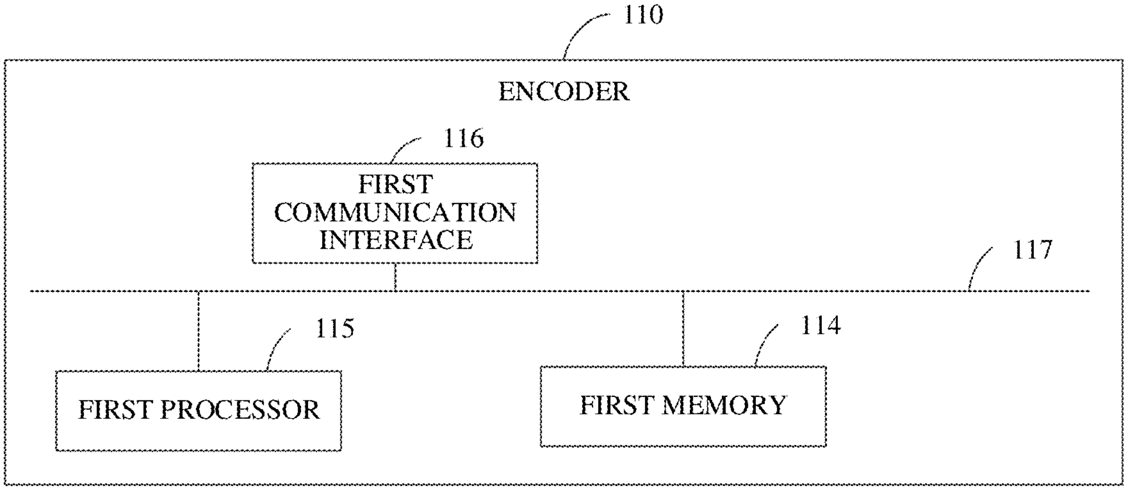
FIG. 9 is schematic structural diagram 2 of an encoder.

Based on the structure of the encoder 110 and the computer-readable storage medium described above, FIG. 9 is schematic structural diagram 2 of an encoder. As illustrated in FIG. 9, the encoder 110 can include a first memory 114, a first processor 115, a first communication interface 116, and a first bus system 117. The first memory 114, the first processor 115, and the first communication interface 116 are coupled together through the first bus system 117. It can be understood that, the first bus system 117 is used to implement connection and communication between these components. In addition to a data bus, the first bus system 117 also includes a power bus, a control bus, and a status signal bus. However, for clarity of description, in FIG. 9, various buses are marked as the first bus system 117.

The first communication interface 116 is used for receiving and sending signals in the process of sending/receiving information to/from other external network elements.

The first memory 114 is configured to store computer programs than can be run on the first processor 115.

The first processor 115 is configured to execute the following when running the computer programs.

A prediction mode parameter is determined. An MIP parameter of a current block is determined, when the prediction mode parameter indicates that MIP is used for the current block to determine an intra prediction value. An intra prediction block of the current block is determined according to the MIP parameter, and a residual block obtained by subtracting the intra prediction value from the current block is calculated. A mapping mode of an LFNST transform set is determined according to the MIP parameter, when an LFNST is used for the current block. According to the mapping mode of the LFNST transform set, one LFNST transform kernel candidate set is selected from multiple LFNST transform kernel candidate sets, an LFNST transform kernel used for the current block is determined from the selected LFNST transform kernel candidate set, and an LFNST index is set and the LFNST index is signaled into a video bitstream. The residual block is transformed using the LFNST transform kernel.

It can be understood that, the first memory 114 in the embodiment of the disclosure can be a volatile memory or a non-volatile memory, or can include both volatile and non-volatile memory. The non-volatile memory can be a ROM, a programmable read-only memory (PROM), an erasable programmable read-only memory (EPROM), an electrically erasable programmable read-only memory (EEPROM) or flash memory. The volatile memory can be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM). It is noted that the first memory 114 of the systems and methods described herein is intended to include, but is not limited to, these and any other suitable types of memory.

The first processor 115 can be an integrated circuit chip and has a signal processing capability. In the implementation process, each step of the foregoing method can be completed by using an integrated logic circuit of hardware in the first processor 115 or an instruction in a form of software. The above first processor 115 can be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the embodiments of the disclosure can be implemented or executed. The general-purpose processor can be a microprocessor or the processor can be any conventional processor or the like. The steps of the method disclosed in combination with the embodiments of the disclosure can be directly implemented by a hardware decoding processor, or can be performed by using a combination of hardware and software modules in the decoding processor. The software module can be located in a mature storage medium such as a random access memory, a flash memory, a read-only memory, a programmable read-only memory, or an electrically erasable programmable memory, a register, and the like. The storage medium is located in the first memory 114, and the first processor 115 reads the information in the first memory 114 and completes the steps of the foregoing method in combination with its hardware.

It can be understood that these embodiments described in the disclosure can be implemented by hardware, software, firmware, middleware, a microcode or a combination thereof. In case of hardware implementation, the processing unit can be implemented in one or more ASICs, DSPs, DSP devices (DSPDs), PLDs, FPGAs, universal processors, controllers, microcontrollers, microprocessors, other electronic units configured to execute the functions in the disclosure or combinations thereof. In case of software implementation, the technology of the disclosure can be implemented through the modules (for example, processes and functions) executing the functions in the disclosure. A software code can be stored in the memory and executed by the processor. The memory can be implemented inside the processor or outside the processor.

Optionally, in another embodiment, the first processor 115 is further configured to execute the method described in any of the foregoing embodiments when running the computer programs.

Figure 10:
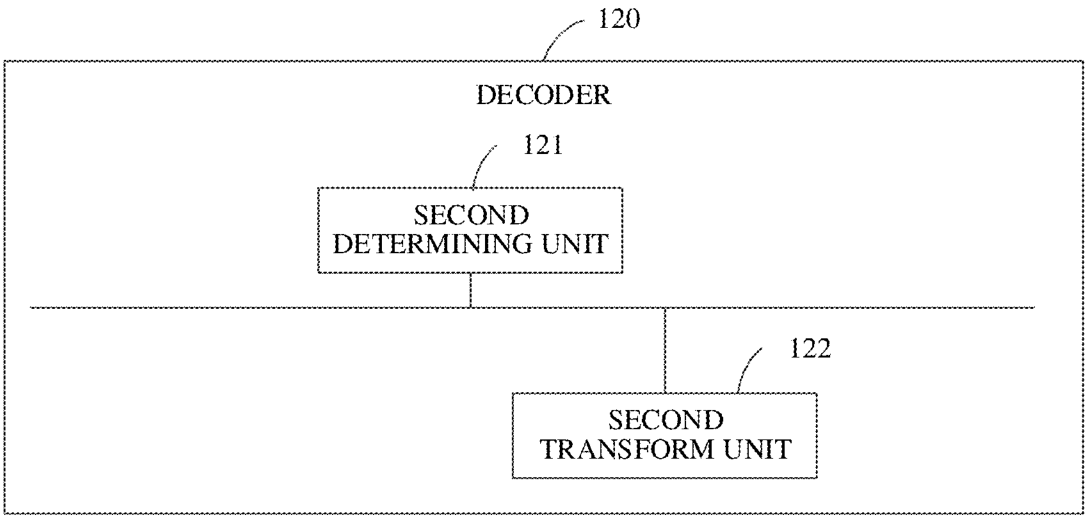
FIG. 10 is schematic structural diagram 1 of a decoder.

FIG. 10 is schematic structural diagram 1 of a decoder. As illustrated in FIG. 10, the decoder 120 includes a second determining unit 121 and a second transform unit 122.

The second determining unit 121 is configured to: decode a bitstream to determine a prediction mode parameter; decode the bitstream to determine a matrix-based intra prediction (MIP) parameter of a current block, when the prediction mode parameter indicates that MIP is used to determine an intra prediction value; decode the bitstream to determine transform coefficients of the current block and an LFNST index of the current block; determine a mapping mode of an LFNST transform set according to the MIP parameter, when the LFNST index indicates that an LFNST is used for the current block; select, according to the mapping mode of the LFNST transform set, one LFNST transform kernel candidate set from multiple LFNST transform kernel candidate sets, and determine an LFNST transform kernel used for the current block from the selected LFNST transform kernel candidate set. The second transform unit 122 is configured to transform the transform coefficients using the LFNST transform kernel.

It can be understood that, in the embodiment, a "unit" can be a part of a circuit, a part of a processor, a part of a program, or software, etc., which can be a module or not. In addition, in the embodiment, the various components can be integrated into one processing unit, or each unit can be physically present, or two or more units can be integrated into one unit. The above-mentioned integrated unit can be implemented in the form of hardware or a software function unit.

The integrated unit can be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, can be embodied in the form of a software product which is stored in a memory and includes instructions for causing a computer device (which can be a personal computer, a server, a network device, or the like) or a processor to perform all or part of the steps described in the various embodiments of the present disclosure. The memory includes various medium capable of storing program codes, such as a universal serial bus (USB) flash disk, a read-only memory (ROM), a random access memory (RAM), a removable hard disk, disk, compact disc (CD), or the like.

Thus, embodiments of the disclosure provide a computer-readable storage medium. The computer-readable storage medium is applied to the decoder 120 and stores computer programs. When executed by a second processor, the computer programs are configured to implement the method of any of the above embodiments.

Figure 11:
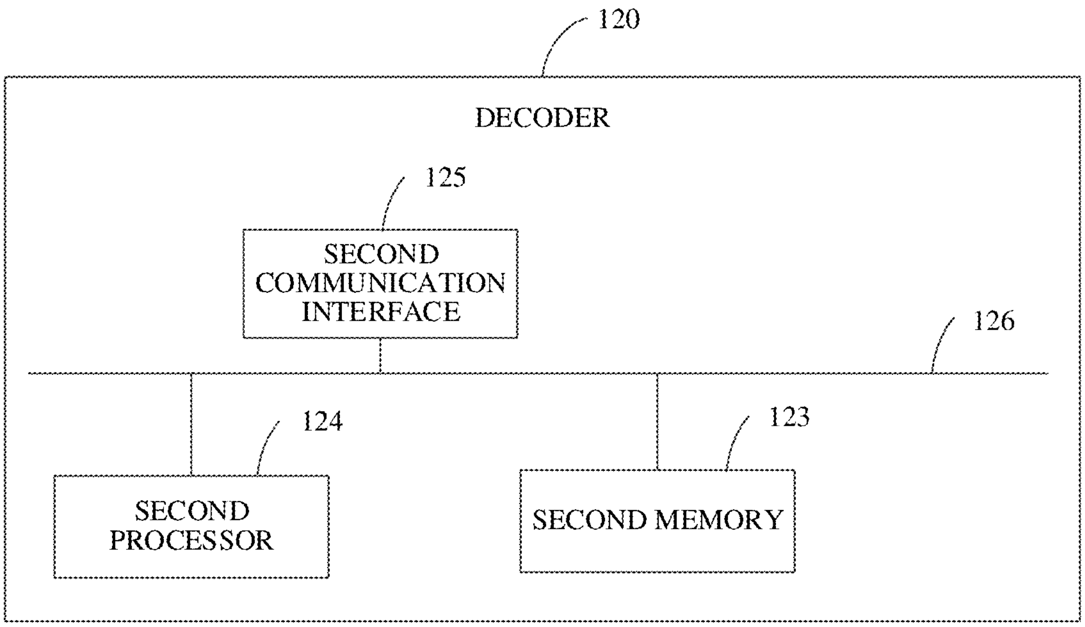
FIG. 11 is schematic structural diagram 2 of a decoder.

Based on the structure of the decoder 120 and the computer-readable storage medium described above, FIG. 11 is schematic structural diagram 2 of a decoder. As illustrated in FIG. 11, the decoder 120 can include a second memory 123, a second processor 124, a second communication interface 125, and a second bus system 126. The second memory 123, the second processor 124, and the second communication interface 125 are coupled together through the second bus system 126. It can be understood that, the second bus system 126 is used to implement connection and communication between these components. In addition to a data bus, the second bus system 126 also includes a power bus, a control bus, and a status signal bus. However, for clarity of description, in FIG. 11, various buses are marked as the second bus system 126.

The second communication interface 125 is used for receiving and sending signals in the process of sending/receiving information to/from other external network elements.

The second memory 123 is configured to store computer programs than can be run on the second processor 124.

The second processor 124 is configured to execute the following when running the computer programs.

A bitstream is decoded to determine a prediction mode parameter. The bitstream is decoded to determine an MIP parameter of a current block, when the prediction mode parameter indicates that MIP is used to determine an intra prediction value. The bitstream is decoded to determine transform coefficients of the current block and an LFNST index of the current block. A mapping mode of an LFNST transform set is determined according to the MIP parameter, when the LFNST index indicates that an LFNST is used for the current block. According to the mapping mode of the LFNST transform set, one LFNST transform kernel candidate set is selected from multiple LFNST transform kernel candidate sets, and an LFNST transform kernel used for the current block is determined from the selected LFNST transform kernel candidate set. The transform coefficients are transformed using the LFNST transform kernel.

It can be understood that, the second memory 123 in the embodiment of the disclosure can be a volatile memory or a non-volatile memory, or can include both volatile and non-volatile memory. The non-volatile memory can be a ROM, a programmable read-only memory (PROM), an erasable programmable read-only memory (EPROM), an electrically erasable programmable read-only memory (EEPROM) or flash memory. The volatile memory can be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM). It is noted that the second memory 123 of the systems and methods described herein is intended to include, but is not limited to, these and any other suitable types of memory.

The second processor 124 can be an integrated circuit chip and has a signal processing capability. In the implementation process, each step of the foregoing method can be completed by using an integrated logic circuit of hardware in the second processor 124 or an instruction in a form of software. The above second processor 124 can be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the embodiments of the disclosure can be implemented or executed. The general-purpose processor can be a microprocessor or the processor can be any conventional processor or the like. The steps of the method disclosed in combination with the embodiments of the disclosure can be directly implemented by a hardware decoding processor, or can be performed by using a combination of hardware and software modules in the decoding processor. The software module can be located in a mature storage medium such as a random access memory, a flash memory, a read-only memory, a programmable read-only memory, or an electrically erasable programmable memory, a register, and the like. The storage medium is located in the second memory 123, and the second processor 124 reads the information in the second memory 123 and completes the steps of the foregoing method in combination with its hardware.

It can be understood that these embodiments described in the disclosure can be implemented by hardware, software, firmware, middleware, a microcode or a combination thereof. In case of hardware implementation, the processing unit can be implemented in one or more ASICs, DSPs, DSP devices (DSPDs), PLDs, FPGAs, universal processors, controllers, microcontrollers, microprocessors, other electronic units configured to execute the functions in the disclosure or combinations thereof. In case of software implementation, the technology of the disclosure can be implemented through the modules (for example, processes and functions) executing the functions in the disclosure. A software code can be stored in the memory and executed by the processor. The memory can be implemented inside the processor or outside the processor.

The encoder and the decoder are provided in embodiments of the disclosure. In deriving the prediction block, according to the size parameter in the MIP parameter of the current block, the mapping mode of the LFNST transform set is determined, and for the larger-sized picture block, the DIMD is not used to derive the mapping mode, which can reduce the computational complexity and improve the encoding efficiency.

It is noted that in disclosure, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including a . . . " does not exclude the existence of other same elements in the process, method, article, or device that includes the element.

The serial numbers of the foregoing embodiments of the disclosure are only for description, and do not represent the superiority of the embodiments.

The methods disclosed in the several method embodiments of the disclosure can be combined without conflict to obtain new method embodiments.

The features disclosed in the several product embodiments of the disclosure can be combined without conflict to obtain new product embodiments.

The features disclosed in the several method embodiments or device embodiments of the disclosure can be combined without conflict to obtain new method embodiments or device embodiments.

The above are some embodiments of the disclosure, but the protection scope of the disclosure is not limited thereto. Any changes or substitutions that can be easily conceived by those skilled in the art within the technical scope disclosed by disclosure should be covered by the protection scope of the disclosure. Therefore, the protection scope of the disclosure should be subject to the protection scope of the claims.

INDUSTRIAL APPLICABILITY

An encoding and decoding method, an encoder, a decoder, and a storage medium are provided in embodiments of the disclosure. At a decoding side, a bitstream is decoded to determine a prediction mode parameter. The bitstream is decoded to determine an MIP parameter of a current block, when the prediction mode parameter indicates that MIP is used to determine an intra prediction value. The bitstream is decoded to determine transform coefficients of the current block and an LFNST index of the current block. A mapping mode of an LFNST transform set is determined according to the MIP parameter, when the LFNST index indicates that an LFNST is used for the current block. According to the mapping mode of the LFNST transform set, one LFNST transform kernel candidate set is selected from multiple LFNST transform kernel candidate sets, and an LFNST transform kernel used for the current block is determined from the selected LFNST transform kernel candidate set. The transform coefficients are transformed using the LFNST transform kernel. At an encoding side, a prediction mode parameter is determined. An MIP parameter of a current block is determined, when the prediction mode parameter indicates that MIP is used for the current block to determine an intra prediction value. An intra prediction block of the current block is determined according to the MIP parameter, and a residual block obtained by subtracting the intra prediction value from the current block is calculated. A mapping mode of an LFNST transform set is determined according to the MIP parameter, when an LFNST is used for the current block. According to the mapping mode of the LFNST transform set, one LFNST transform kernel candidate set is selected from multiple LFNST transform kernel candidate sets, an LFNST transform kernel used for the current block is determined from the selected LFNST transform kernel candidate set, and an LFNST index is set and the LFNST index is signaled into a video bitstream. The residual block is transformed using the LFNST transform kernel. Therefore, in embodiments of the disclosure, in deriving the prediction block, according to a size parameter in the MIP parameter of the current block, the mapping mode of the LFNST transform set is determined, and for a larger-sized picture block, DIMD is not used to derive the mapping mode, which can reduce the computational complexity and improve the encoding efficiency.

What is claimed is:

1. A decoding method, applicable to a decoder and comprising:

decoding a bitstream to determine a prediction mode parameter;

determining a matrix-based intra prediction (MIP) parameter of a current block, in response to the prediction mode parameter indicating that MIP is used to determine an intra prediction value, wherein the MIP parameter comprises a size parameter of the current block;

determining transform coefficients of the current block and a low-frequency non-separable transform (LFNST) index of the current block;

determining a mapping mode of an LFNST transform set using decoder side intra mode derivation (DIMD) in response to the size parameter not satisfying a first preset condition, wherein the mapping mode of the LFNST transform set is an intra prediction mode mapped to the LFNST transform set;

selecting, according to the mapping mode of the LFNST transform set, one LFNST transform kernel candidate set from a plurality of LFNST transform kernel candidate sets, and determining, according to the LFNST index, an LFNST transform kernel used for the current block from the selected LFNST transform kernel candidate set; and transforming the transform coefficients using the LFNST transform kernel.

2. The method of claim 1, further comprising:

determining a downsampling vector of the current block according to the MIP parameter;

performing matrix multiplication calculation according to the downsampling vector, to obtain an MIP output vector;

for the MIP output vector, traversing at least one intra prediction mode to obtain at least one gradient information;

determining a gradient amplitude value corresponding to each intra prediction mode according to the at least one gradient information; and determining, among the at least one intra prediction mode, an intra prediction mode with a largest gradient amplitude value as the mapping mode of the LFNST transform set.

3. The method of claim 1, wherein the size parameter comprises a height and a width of the current block, and the method further comprises:

determining that the size parameter does not satisfy the first preset condition, in response to the height of the current block being less than a preset height threshold and/or the width of the current block being less than a preset width threshold.

4. The method of claim 1, further comprising:

determining an index of the mapping mode of the LFNST transform set;

determining a value of an LFNST intra prediction mode index according to a value of the index;

selecting, according to the value of the LFNST intra prediction mode index, one LFNST transform kernel candidate set from the plurality of LFNST transform kernel candidate sets; and selecting, from the selected LFNST transform kernel candidate set, a transform kernel indicated by the LFNST index and setting the transform kernel indicated by the LFNST index as the LFNST transform kernel used for the current block.

5. The method of claim 4, further comprising:

the plurality of LFNST transform kernel candidate sets comprises 35 LFNST transform kernel candidate sets, wherein each LFNST transform kernel candidate set comprises 3 LFNST transform kernels; and determining an index of an LFNST transform kernel candidate set corresponding to the LFNST intra prediction mode index using a second look-up table.

6. The method of claim 5, wherein the MIP parameter comprises an MIP transpose indication parameter, and a value of the MIP transpose indication parameter indicates whether to transpose a sample input vector used in the MIP mode.

7. The method of claim 6, further comprising:

performing matrix-transpose on the transform kernel indicated by the LFNST index to obtain the LFNST transform kernel used for the current block, in response to the value of the MIP transpose indication parameter indicating to transpose the sample input vector used in the MIP mode.

8. An encoding method, applicable to an encoder and comprising:

determining a prediction mode parameter;

determining a matrix-based intra prediction (MIP) parameter of a current block, in response to the prediction mode parameter indicating that MIP is used for the current block to determine an intra prediction value, wherein the MIP parameter comprises a size parameter of the current block;

determining an intra prediction block of the current block according to the MIP parameter, and calculating a residual block obtained by subtracting the intra prediction value from the current block;

determining a mapping mode of a low-frequency non-separable transform (LFNST) transform set using decoder side intra mode derivation (DIMD) in response to the size parameter not satisfying a first preset condition, wherein the mapping mode of the LFNST transform set is an intra prediction mode mapped to the LFNST transform set;

selecting, according to the mapping mode of the LFNST transform set, one LFNST transform kernel candidate set from a plurality of LFNST transform kernel candidate sets, determining an LFNST transform kernel used for the current block from the selected LFNST transform kernel candidate set, and setting an LFNST index and signalling the LFNST index into a video bitstream; and transforming the residual block using the LFNST transform kernel.

9. The method of claim 8, further comprising:

determining a downsampling vector of the current block according to the MIP parameter;

performing matrix multiplication calculation according to the downsampling vector, to obtain an MIP output vector;

for the MIP output vector, traversing at least one intra prediction mode to obtain at least one gradient information;

determining a gradient amplitude value corresponding to each intra prediction mode according to the at least one gradient information; and determining, among the at least one intra prediction mode, an intra prediction mode with a largest gradient amplitude value as the mapping mode of the LFNST transform set.

10. The method of claim 8, wherein the size parameter comprises a height and a width of the current block, and the method further comprises:

determining that the size parameter does not satisfy the first preset condition, in response to the height of the current block being less than a preset height threshold and/or the width of the current block being less than a preset width threshold.

11. The method of claim 8, further comprising:

determining an index of the mapping mode of the LFNST transform set;

determining a value of an LFNST intra prediction mode index according to a value of the index;

selecting, according to the value of the LFNST intra prediction mode index, one LFNST transform kernel candidate set from the plurality of LFNST transform kernel candidate sets; and selecting, from the selected LFNST transform kernel candidate set, a transform kernel used for the current block.

12. The method of claim 11, further comprising:

the plurality of LFNST transform kernel candidate sets comprises 35 LFNST transform kernel candidate sets, wherein each LFNST transform kernel candidate set comprises 3 LFNST transform kernels; and accordingly determining an index of an LFNST transform kernel candidate set corresponding to the LFNST intra prediction mode index using a second look-up table.

13. The method of claim 12, wherein the MIP parameter comprises an MIP transpose indication parameter, and a value of the MIP transpose indication parameter indicates whether to transpose a sample input vector used in the MIP mode.

14. The method of claim 13, further comprising:

performing matrix-transpose on the selected transform kernel to obtain the LFNST transform kernel used for the current block, in response to the value of the MIP transpose indication parameter indicating to transpose the sample input vector used in the MIP mode.

15. A non-transitory computer-readable storage medium storing a computer program and a bitstream, wherein when executed by a processor, the computer program causes the processor to implement an encoding method to generate the bitstream, the encoding method comprising:

determining a prediction mode parameter;

determining a matrix-based intra prediction (MIP) parameter of a current block, in response to the prediction mode parameter indicating that MIP is used for the current block to determine an intra prediction value, wherein the MIP parameter comprises a size parameter of the current block;

determining an intra prediction block of the current block according to the MIP parameter, and calculating a residual block obtained by subtracting the intra prediction value from the current block;

determining a mapping mode of a low-frequency non-separable transform (LFNST) transform set using decoder side intra mode derivation (DIMD) in response to the size parameter not satisfying a first preset condition, wherein the mapping mode of the LFNST transform set is an intra prediction mode mapped to the LFNST transform set;

selecting, according to the mapping mode of the LFNST transform set, one LFNST transform kernel candidate set from a plurality of LFNST transform kernel candidate sets, determining an LFNST transform kernel used for the current block from the selected LFNST transform kernel candidate set, and setting an LFNST index and signalling the LFNST index into a video bitstream; and transforming the residual block using the LFNST transform kernel.

16. The non-transitory computer-readable storage medium of claim 15, further comprising:

determining a downsampling vector of the current block according to the MIP parameter;

performing matrix multiplication calculation according to the downsampling vector, to obtain an MIP output vector;

for the MIP output vector, traversing at least one intra prediction mode to obtain at least one gradient information;

determining a gradient amplitude value corresponding to each intra prediction mode according to the at least one gradient information; and determining, among the at least one intra prediction mode, an intra prediction mode with a largest gradient amplitude value as the mapping mode of the LFNST transform set.

17. The non-transitory computer-readable storage medium of claim 15, wherein the size parameter comprises a height and a width of the current block, further comprising:

determining that the size parameter does not satisfy the first preset condition, in response to the height of the current block being less than a preset height threshold and/or the width of the current block being less than a preset width threshold.

* * * * *